US012558620B2

(12) United States Patent
Li

(10) Patent No.: US 12,558,620 B2
(45) Date of Patent: Feb. 24, 2026

(54) METHOD AND APPARATUS FOR RECORDING SCENE IN GAME, AND DEVICE AND STORAGE MEDIUM

(71) Applicant: NETEASE (HANGZHOU) NETWORK CO., LTD., Zhejiang (CN)

(72) Inventor: Guang Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 307 days.

(21) Appl. No.: 18/555,883

(22) PCT Filed: Feb. 24, 2022

(86) PCT No.: PCT/CN2022/077580
§ 371 (c)(1),
(2) Date: Oct. 18, 2023

(87) PCT Pub. No.: WO2022/222595
PCT Pub. Date: Oct. 27, 2022

(65) Prior Publication Data
US 2024/0198221 A1      Jun. 20, 2024

(30) Foreign Application Priority Data

Apr. 19, 2021    (CN) .......................... 202110421747.4

(51) Int. Cl.
*A63F 13/49* (2014.01)
*A63F 13/5372* (2014.01)

(52) U.S. Cl.
CPC .......... *A63F 13/49* (2014.09); *A63F 13/5372* (2014.09); *A63F 2300/308* (2013.01)

(58) Field of Classification Search
CPC ................. A63F 13/49; A63F 13/5372; A63F 2300/308
(Continued)

(56) References Cited

U.S. PATENT DOCUMENTS 9,155,960 B2 * 10/2015 Argiro ................... A63F 13/92
9,473,758 B1 * 10/2016 Long ................... H04N 13/275
(Continued)

FOREIGN PATENT DOCUMENTS

CN      108295468 A      7/2018
CN      108509278 A      9/2018
(Continued)

OTHER PUBLICATIONS

International Search Report dated May 24, 2022 of International Application No. PCT/CN2022/077580.
(Continued)

*Primary Examiner* — Allen Chan
(74) *Attorney, Agent, or Firm* — Qinghong Xu

(57)      ABSTRACT
The present disclosure relates to the field of games, and provides a method and apparatus for recording a scene in a game and a device and a storage medium. A graphical user interface is provided by means of a terminal. The method includes: displaying a game interface on the graphical user interface; responding to a movement operation for a first virtual object in the game interface, and controlling a range of the virtual scene displayed in the game interface to change according to the movement operation; acquiring a target image of a preset range of a current game interface in response to a record command triggered in a first game task phase; storing the target image as a reasoning record image of the first virtual object; and displaying the reasoning record image in response to a view command triggered in a second game task phase.

19 Claims, 20 Drawing Sheets

(58) Field of Classification Search
USPC ........................................................... 463/31
See application file for complete search history.

(56) References Cited

U.S. PATENT DOCUMENTS

| | | | | | |
|---|---|---|---|---|---|
| 10,610,782 | B2 * | 4/2020 | Motokura | ............... | A63F 13/49 |
| 2005/0209983 | A1 | 9/2005 | MacPherson | | |
| 2013/0215024 | A1 * | 8/2013 | Nakayama | ............ | A63F 13/213 |
| | | | | | 345/157 |
| 2015/0206013 | A1 | 7/2015 | Oguchi | | |
| 2019/0378320 | A1 * | 12/2019 | Kim | .................... | G06F 9/45533 |

FOREIGN PATENT DOCUMENTS

| | | | |
|---|---|---|---|
| CN | 109316747 | A | 2/2019 |
| CN | 110052035 | A | 7/2019 |
| CN | 110090444 | A | 8/2019 |
| CN | 110339570 | A | 10/2019 |
| CN | 111888754 | A | 11/2020 |
| CN | 111957040 | A | 11/2020 |
| CN | 113101637 | A | 7/2021 |
| KR | 20020078449 | A | 10/2002 |
| WO | 2020253685 | A1 | 12/2020 |

OTHER PUBLICATIONS

Notice of Allowance dated Dec. 15, 2023 for Chinese Application No. 202110421747.4.

* cited by examiner

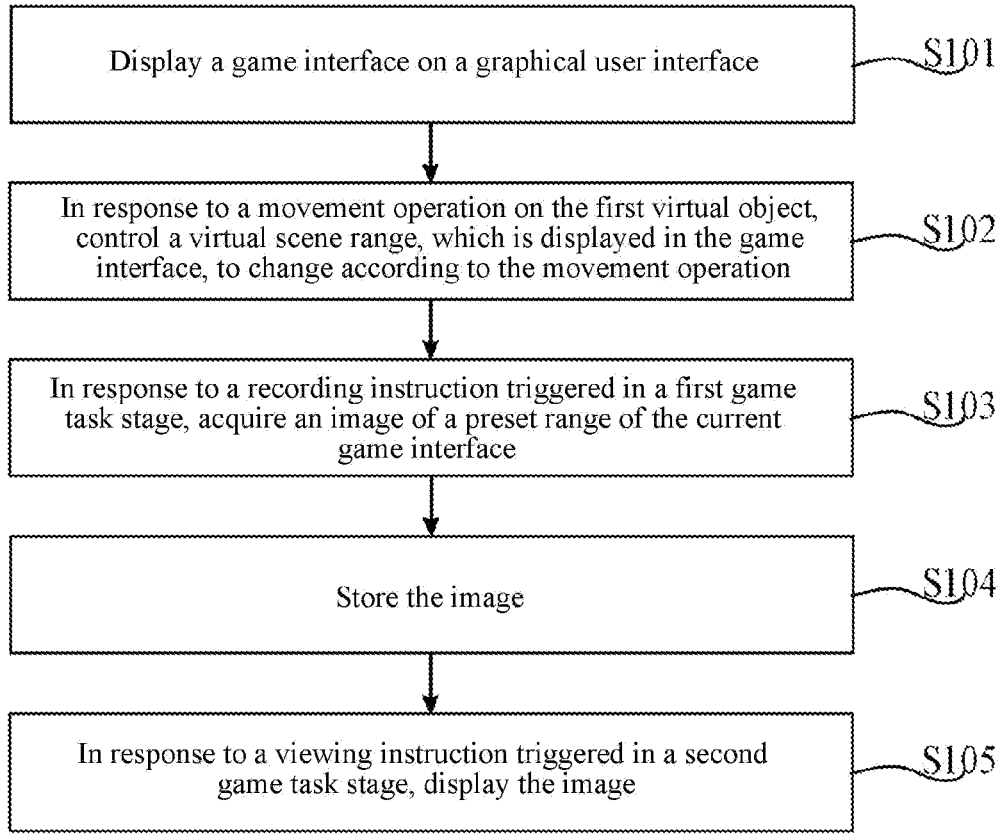

Display a game interface on a graphical user interface — S101

In response to a movement operation on the first virtual object, control a virtual scene range, which is displayed in the game interface, to change according to the movement operation — S102

In response to a recording instruction triggered in a first game task stage, acquire an image of a preset range of the current game interface — S103

Store the image — S104

In response to a viewing instruction triggered in a second game task stage, display the image — S105

FIG.1

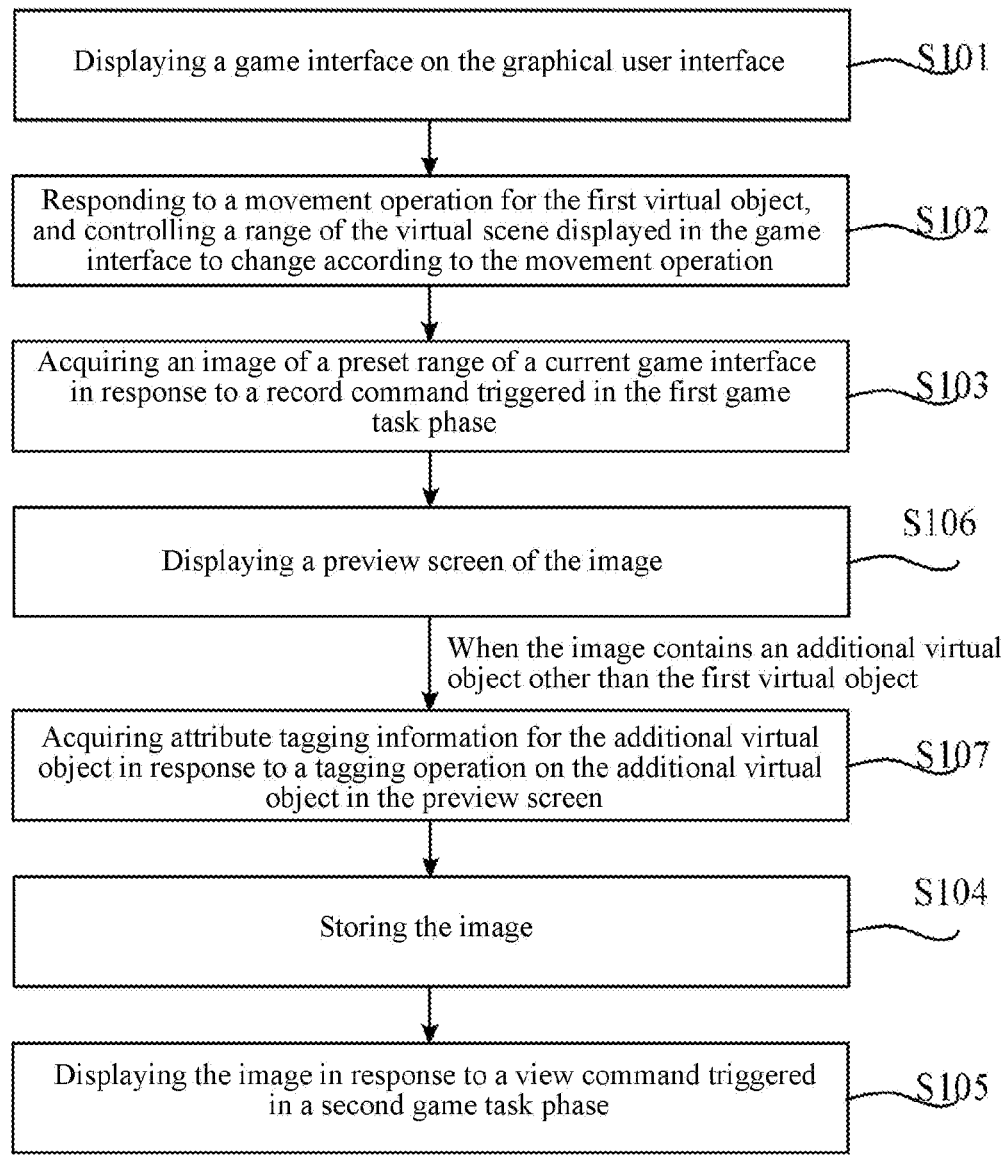

Displaying a game interface on the graphical user interface ——S101

Responding to a movement operation for the first virtual object, and controlling a range of the virtual scene displayed in the game interface to change according to the movement operation ——S102

Acquiring an image of a preset range of a current game interface in response to a record command triggered in the first game task phase ——S103

Displaying a preview screen of the image ——S106

When the image contains an additional virtual object other than the first virtual object Acquiring attribute tagging information for the additional virtual object in response to a tagging operation on the additional virtual object in the preview screen ——S107

Storing the image ——S104

Displaying the image in response to a view command triggered in a second game task phase ——S105

FIG.4

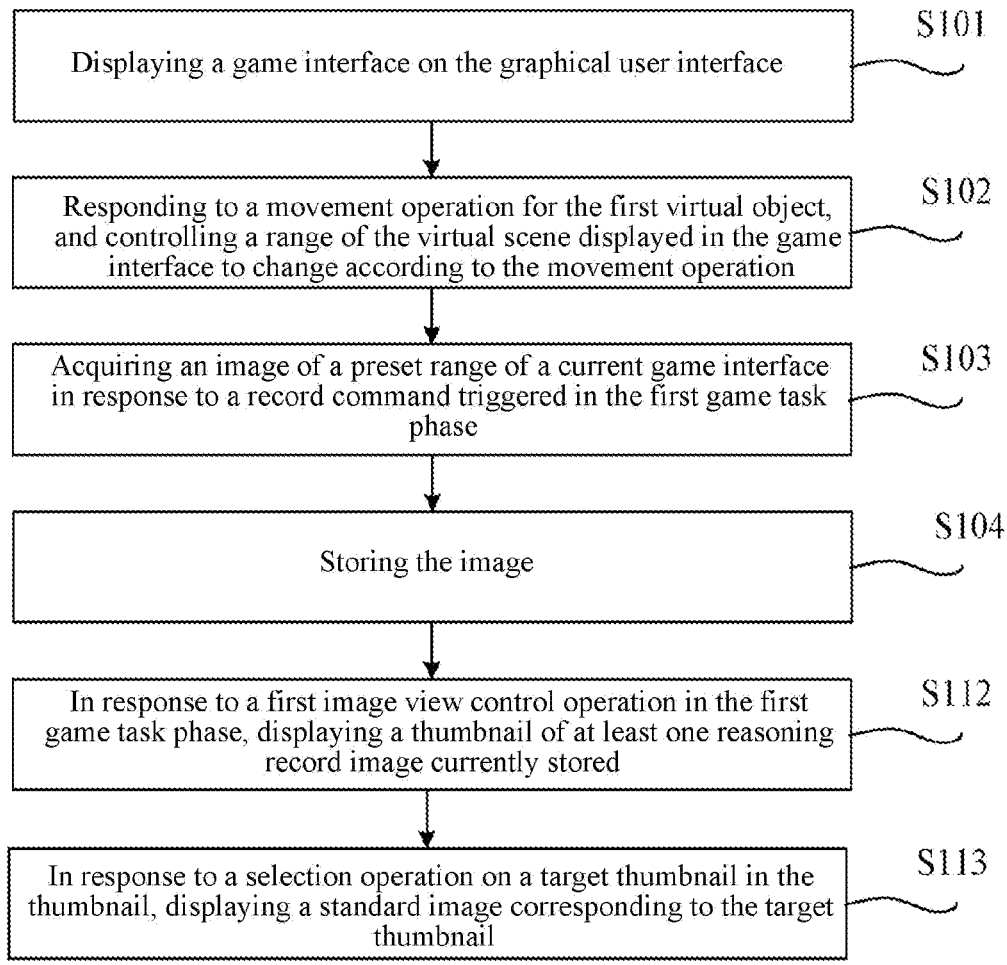

Displaying a game interface on the graphical user interface — S101

Responding to a movement operation for the first virtual object, and controlling a range of the virtual scene displayed in the game interface to change according to the movement operation — S102

Acquiring an image of a preset range of a current game interface in response to a record command triggered in the first game task phase — S103

Storing the image — S104

In response to a first image view control operation in the first game task phase, displaying a thumbnail of at least one reasoning record image currently stored — S112

In response to a selection operation on a target thumbnail in the thumbnail, displaying a standard image corresponding to the target thumbnail — S113

FIG.11

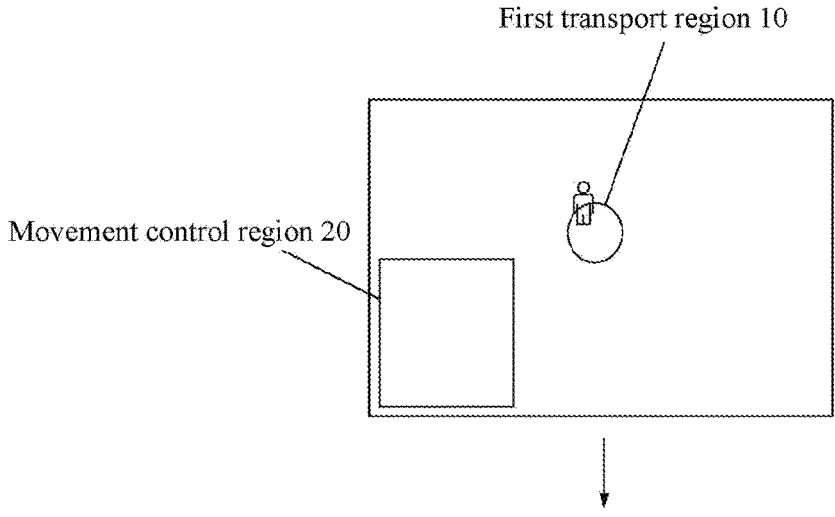
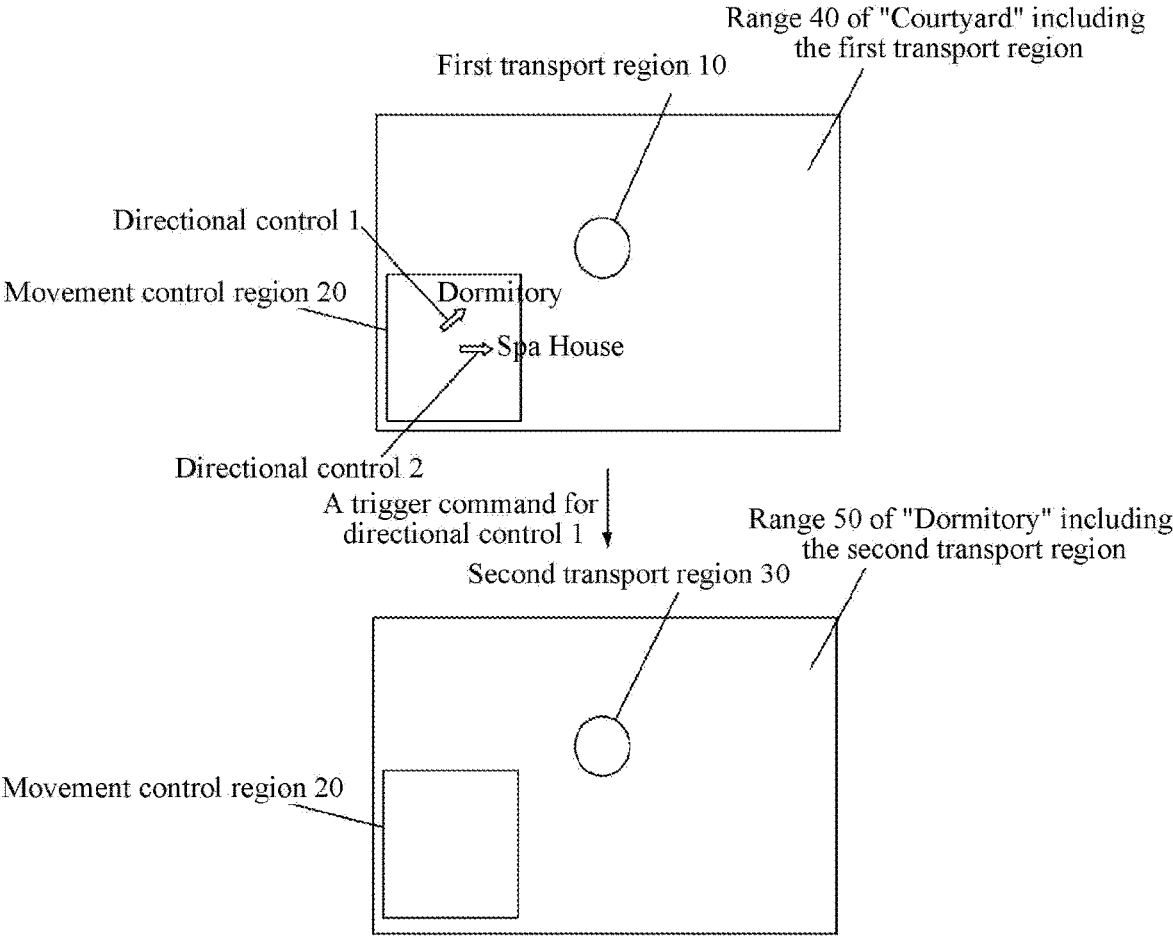
FIG.17

METHOD AND APPARATUS FOR RECORDING SCENE IN GAME, AND DEVICE AND STORAGE MEDIUM

CROSS-REFERENCE TO RELATED APPLICATIONS

The present disclosure is the U.S. national phase application of International Application PCT/CN2022/077580, filed on Feb. 24, 2022, which is based on and claims the priority of the Chinese Patent Application No. 202110421747.4, filed on Apr. 19, 2021, and entitled "METHOD AND APPARATUS FOR RECORDING SCENE IN GAME, AND DEVICE AND STORAGE MEDIUM", the entire contents of both of which are hereby incorporated by reference for all purposes.

TECHNICAL FIELD

The present disclosure relates to the field of gaming technology, and in particular, to a method and apparatus for recording a scene in a game, and a device and storage medium.

BACKGROUND

Most of the current reasoning games may be divided into two sessions, namely an action session and a voting session. In the action session, all the surviving players may take action, such as players in the civilian camp may do the quest (or task), and players in the killer camp may mess up, do the quest, or kill someone, and so on.

In the action session, the game player is required to do the quest and memorize some key scenes and events during the quest in order to identify the player in the killer camp in the subsequent discussion and voting session.

SUMMARY

In a first aspect, a method for recording a scene in a game is provided according to some embodiments of the present disclosure, in which a graphical user interface is provided via a terminal, the method including:

displaying a game interface on the graphical user interface, the game interface comprising at least part of a first virtual scene in a first game task phase, and a first virtual object located in the first virtual scene;

responding to a movement operation for the first virtual object, and controlling a range of the virtual scene displayed in the game interface to change according to the movement operation;

acquiring an image of a preset range of a current game interface in response to a record command triggered in the first game task phase;

storing the image, the image being a reasoning record image of the first virtual object; and displaying the image in response to a view command triggered in a second game task phase, the second game task phase and the first game task phase being different task phases in a game match that the first virtual object is currently in.

In a second aspect, a device for recording a scene in a game is provided according to some embodiments of the present disclosure, the device including: a processor, a storage medium and a bus, the storage medium storing machine-readable instructions executable by the processor, wherein the processor communicates with the storage medium via the bus when the device for recording the scene in the game is in operation, and the processor executes the machine-readable instructions to perform the steps of the method as set forth in the first aspect.

In a third aspect, a non-transitory storage medium is provided according to some embodiments of the present disclosure, the storage medium having a computer program stored thereon, wherein the computer program, when run by a processor, causes the processor to perform the steps of the method as set forth in the first aspect.

BRIEF DESCRIPTION OF THE DRAWINGS

In order to more clearly illustrate the technical solutions in the embodiments of the present disclosure, the accompanying drawings to be used in the description of the embodiments will be briefly described below. It should be understood that the drawings below show only some of the embodiments of the present disclosure and should not be considered as limiting the scope of the present disclosure, and other relevant drawings can be obtained from these drawings by those of ordinary skill in the art without creative labor.

FIG. 1 is a flowchart of a method for recording a scene in a game provided by some embodiments of the present disclosure.

FIG. 4 is a flowchart of a method for recording a scene in a game provided by some embodiments of the present disclosure.

FIG. 11 is a flowchart of a method for recording a scene in a game provided by some embodiments of the present disclosure.

FIG. 17 is a schematic diagram of a game interface image provided by some embodiments of the present disclosure.

Figure 18:
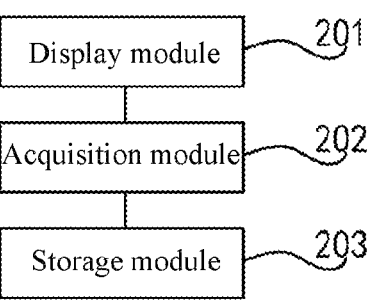

FIG. 18 is a schematic diagram of a structure of an apparatus for recording a scene in a game provided in some embodiments of the present disclosure.

Figure 19:
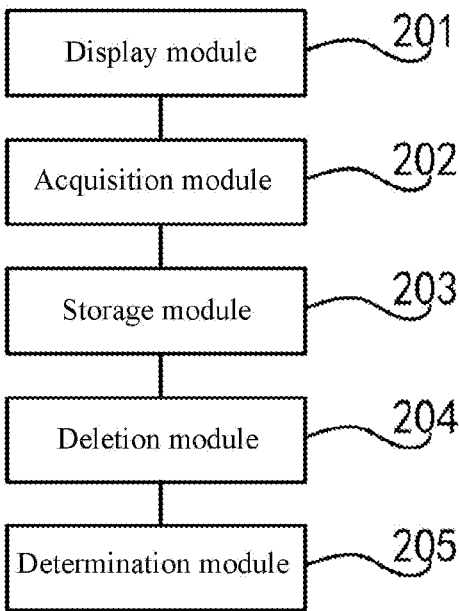

FIG. 19 is a schematic diagram of a structure of an apparatus for recording a scene in a game provided in some embodiments of the present disclosure.

Figure 20:
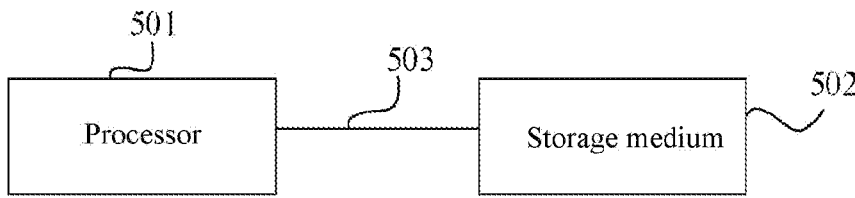

FIG. 20 is a schematic diagram of a structure of a device for recording a scene in a game provided in some embodiments of the present disclosure.

DETAILED DESCRIPTION

In order to make the purpose, technical solutions and advantages of the embodiments of the present disclosure clearer, the technical solutions will be described below in a clear and complete manner in conjunction with the accompanying drawings in the embodiments of the present disclosure. It is apparent that the described embodiments are a part of the embodiments of the present disclosure, and not all of the embodiments.

The components of embodiments of the present disclosure generally described and illustrated in the accompanying drawings herein may be arranged and designed in a variety of different configurations. Accordingly, the following detailed description of embodiments of the present disclosure provided in the accompanying drawings is not intended to limit the scope of the present disclosure for which protection is claimed, but rather represents only selected embodiments of the present disclosure. Based on the embodiments of the present disclosure, all other embodiments obtained by a person skilled in the art without creative labor are within the scope of protection of the present disclosure.

Flowcharts used in the present disclosure illustrate operations realized in accordance with some embodiments of the present disclosure. It should be understood that the operations of the flowcharts may be implemented out of order, and that steps that do not have a logical contextual relationship may be reversed or implemented simultaneously. In addition, a person skilled in the art may be guided by the present disclosure to add one or more other operations to the flowchart, or to remove one or more operations from the flowchart.

Virtual scene: a virtual scene is displayed (or provided) when an application is running on a terminal or server. In some embodiments, the virtual scene is a simulation environment for the real world, or a semi-simulated and semi-fictional virtual environment, or a pure fictional virtual environment. The virtual scene is any kind of two-dimensional virtual scene and three-dimensional virtual scene. The virtual environment may be the sky, land, sea, etc., of which, the land includes deserts, cities and other environmental elements. Among them, the virtual scene is the scene of complete game logic of the virtual object controlled by the user.

Virtual object: a virtual object refers to a dynamic object that may be controlled in the virtual scene. In some embodiments, the dynamic object may be a virtual character, a virtual animal, an animated character, and so on. The virtual object is a character controlled by a game player through an input device, or an artificial intelligence (AI) that has been trained to battle in a virtual environment, or a non-player character (NPC) that has been set up to battle in a virtual scenario. In some embodiments, the virtual object is a virtual character competing in a virtual scene. In some embodiments, the number of virtual objects in the battle of the virtual scene may be preset or may be dynamically determined according to the number of clients participating in the battle, which is not limited by the embodiments of the present disclosure. In one possible implementation, the user can control the movement of the virtual object in the virtual scene, such as running, jumping, crawling, etc., and can also control the virtual object to use the skills, virtual props, etc., provided by the application to fight with other virtual objects.

Player character: a player character refers to a virtual object that may be controlled by the game player to move around in the game environment. In some video games, it may also be called a god character (or Shikigami character) or hero character. The player character may be at least one of the different forms such as a virtual character, a virtual animal, an animated character, a virtual vehicle, etc.

Game interface: a game interface refers to an interface corresponding to an application provided or displayed through a graphical user interface, which includes a UI interface for game player interaction and a game screen. In some embodiments, the UI interface may include game controls (e.g., skill controls, movement controls, function controls, etc.), indication signs (e.g., direction indication signs, character indication signs, etc.), information display areas (e.g., number of kills, competition time, etc.), or game setting controls (e.g., system settings, stores, coins, etc.). In some embodiments, the game screen is a display screen corresponding to the virtual scene displayed by the terminal device, and the game screen may include virtual objects such as game characters, NPC characters, AI characters, and so on, which perform game logic in the virtual scene.

Virtual entity: a virtual entity refers to a static object in the virtual scene, such as terrain, houses, bridges, vegetation, etc. in the virtual scene. The static object is often not directly controlled by the game player, but may respond to the interactive behavior (e.g., attack, demolition, etc.) of the virtual object in the scene to make the corresponding performance. For example, the virtual object may demolish, pick up, drag or drop, or construct "buildings". In some embodiments, the virtual entity may not be able to respond to the interactive behavior of the virtual object. For example, the virtual entity may be a building, a door, a window; a plant, etc., in the virtual scene, but the virtual object may not be able to interact with it, e.g., the virtual object may not be able to destroy or dismantle the window.

A method for recording a scene in a game in one embodiment of the present disclosure may run on a local terminal device or a server. When the method for recording the scene in the game runs on the server, the method may be realized and executed based on a cloud interaction system, wherein the cloud interaction system includes a server and a client device.

In some embodiments, various cloud applications, such as cloud gaming, may be run under the cloud interaction system. Taking the cloud gaming as an example, the cloud gaming refers to a game mode based on cloud computing. In the running mode of the cloud gaming, the main body of running the game program and the main body of presenting the game screen are separated, and the storage and running of the information processing method are completed on the cloud game server, while the client device is used for receiving and sending data and presenting the game screen. For example, the client device may be a display device with data transmission function close to the user side, such as a mobile terminal, TV, computer, Personal Digital Assistant (PDA), etc., but the information processing is carried out by the cloud game server in the cloud. When playing the game, the game player operates the client device to send operation commands to the cloud game server, and the cloud game server runs the game according to the operation commands, encodes and compresses the game screen and other data, and returns them to the client device through the network, and finally the client device decodes and outputs the game screen.

In some embodiments, taking a game as an example, a local terminal device stores a game program and is used to present a game screen. The local terminal device is used to interact with the game player via a graphical user interface, i.e., the game program is routinely downloaded, installed, and run via an electronic device. The local terminal device provides the graphical user interface to the game player in a variety of ways, e.g., the graphical user interface may be rendered and displayed on a display screen of the terminal, or may be provided to the game player via holographic projection. For example, the local terminal device may include a display screen and a processor, wherein the display screen is used to present the graphical user interface that includes the game screen, and the processor is used to run the game, generate the graphical user interface, and control the display of the graphical user interface on the display screen.

The method provided in the present disclosure may be applied, for example, in a reasoning virtual scenario. In a reasoning game, a plurality of game players participating in the game join the same game match, and after entering the game match, different character attributes, e.g., identity attributes, are assigned to virtual objects of the different game players, so that different camps may be determined through the different character attributes assigned, and the game players may win the game by performing the tasks assigned by the game during the different match-up phases of the game match. For example, multiple virtual objects with character attribute A may win a game by "eliminating" virtual objects with character attribute B during the match-up phases. Taking a reasoning game which is based on werewolf culture as an example, it typically involves 10 people playing in the same game match, and at the beginning of the match, the identities (character attributes) of the virtual objects in the game match are determined, including, for example, civilian and werewolf identities. The virtual objects with civilian identities win the game by completing the assigned tasks during the match-up phases or by eliminating the virtual objects with werewolf identities in the current game match. The virtual objects with werewolf identities win the game by eliminating other virtual objects that are not werewolves by performing attack behaviors on these virtual objects during the match-up phases.

For the match-up phases of the reasoning game, there are typically two phases: an action phase and a discussion phase.

During the action phase, one or more game tasks are usually assigned. In some embodiments, one or more game tasks are assigned to each virtual object, and the game player completes the game match by controlling the corresponding virtual object to move in the virtual scene and perform the corresponding game tasks. In some embodiments, a common game task may be determined for virtual objects having the same character attribute in the current game match; and in the action phase, the virtual objects participating in the current game match may move freely to different areas of the virtual scene in the action phase to complete the assigned game task, wherein the virtual objects in the current game match include a virtual object having a first character attribute and a virtual object having a second character attribute. In some embodiments, when the virtual object with the second character attribute moves to a preset range of the virtual object with the first character attribute in the virtual scene, the virtual object with the second character attribute may respond to an attack command and attack the virtual object with the first character attribute to eliminate the virtual object with the first character attribute.

The discussion phase provides a discussion function for the virtual object representing the game player, through which the behavior of the virtual object during the action phase is presented to determine whether or not to eliminate a specific virtual object in the current game match.

Taking a reasoning game which is based on werewolf culture as an example, the game match consists of two phases, namely the action phase and the discussion phase. In the action phase, multiple virtual objects in the game match move freely in the virtual scene, wherein other virtual objects appearing in a preset range may be seen on the game screen presented from one virtual object's viewpoint. The virtual object with the civilian identity completes the assigned game task by moving in the virtual scene. The virtual object with the werewolf identity damages the completed task of the virtual object with the civilian identity in the virtual scene, or may perform a specific assigned game task. In addition, the virtual object with the werewolf identity may also attack the virtual object with the civilian identity during the action phase to eliminate the virtual object with the civilian identity. When the game match enters the discussion phase from the action phase, the game players participate in the discussion through the corresponding virtual objects in an attempt to determine the virtual object with the werewolf identity based on the game behaviors in the action phase, and determine the result of the discussion by voting, and determine whether there is a virtual object that needs to be eliminated according to the result of the discussion, and if so, the corresponding virtual object will be eliminated according to the result of the discussion. If not, there is no virtual object that will be eliminated in the current discussion phase. In the discussion phase, the discussion may be conducted by voice, text, or other means.

A method for recording a scene in a game provided by embodiments of the present disclosure will be explained as follows with reference to a number of specific application examples. FIG. 1 is a flowchart of a method for recording a scene in a game provided in some embodiments of the present disclosure, in which a graphical user interface is provided by a terminal device. The terminal device may be the aforementioned local terminal device or a client device in a cloud gaming system. As shown in FIG. 1, the method includes the following steps.

S101, displaying a game interface on the graphical user interface.

In this embodiment of the present disclosure, the game interface includes at least part of a first virtual scene in a first game task phase, and a first virtual object located in the first virtual scene.

Figure 2:
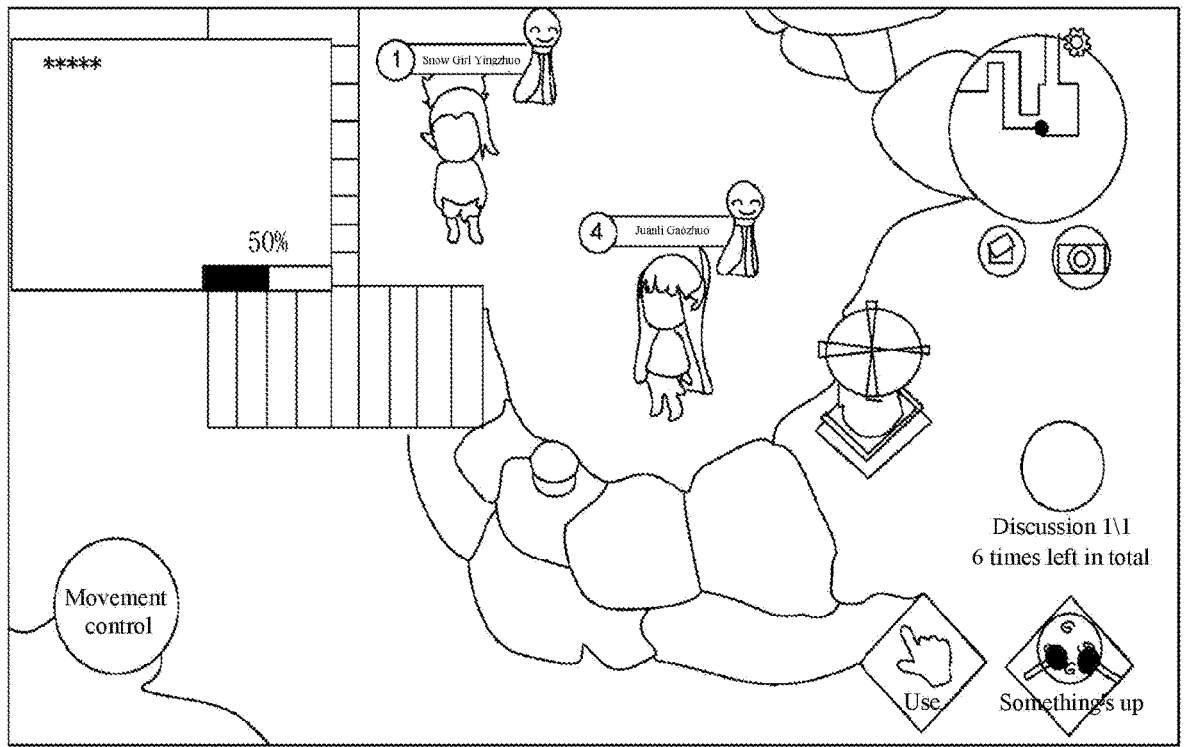
FIG. 2 is a schematic diagram of an image of a current game interface provided by some embodiments of the present disclosure.
Figure 3:
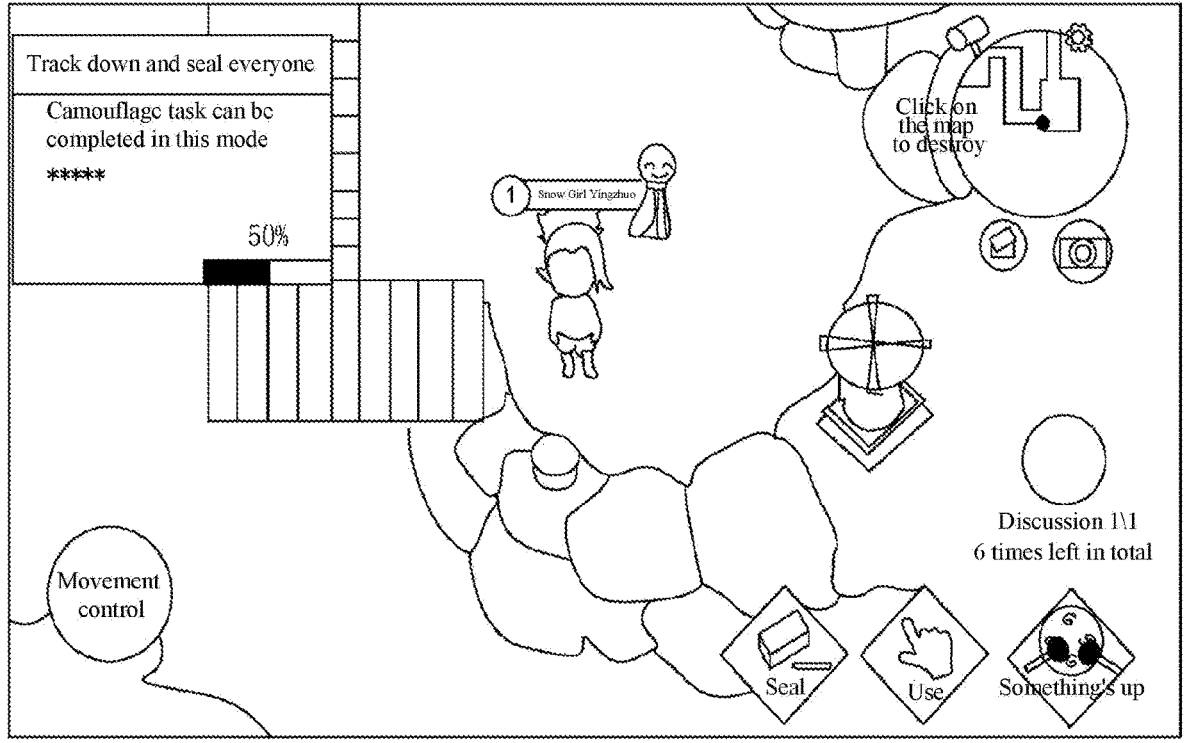
FIG. 3 is a schematic diagram of an image of a current game interface provided by some embodiments of the present disclosure.

FIG. 2 is a schematic diagram of an image of a current game interface provided in some embodiments of the present disclosure. FIG. 3 is a schematic diagram of another image of a current game interface provided in some embodiments of the present disclosure. As shown in FIG. 2 and FIG. 3, the current game interface displays a part of a first virtual scene and a first virtual object located in the first virtual scene. The first virtual object is a virtual object controlled by a game player of the current terminal device. Of course, there may be other virtual objects in the first virtual scene, which is not limited herein.

In this embodiment of the present disclosure, the match-up phase may; for example, include a first game task phase and a second game task phase. The first game task phase may refer to an action phase of each virtual object, under which the game players of different camps correspond to different tasks, and the game players of the respective camps operate their own virtual objects to perform tasks in the current virtual scene according to their own tasks.

In some embodiments of the present disclosure, the virtual objects in the current virtual scene may be divided into two camps: destructive players and ordinary players, and the contents displayed in the game interfaces of the virtual objects in different camps are different. FIG. 2 shows a game interface corresponding to the ordinary player, and the game interface may also display a task bar and a scene map. The task bar is used to display the current pending tasks corresponding to the first virtual object. For example, the pending tasks may be displayed with priority; the completed tasks may be displayed at the bottom of the task bar, or the pending tasks and the completed tasks may be displayed in different colors, for example, the pending tasks may be displayed in red, and the completed tasks may be displayed in gray, and the specific display mode in the task bar may be adjusted according to the user's requirements, which is not limited by the embodiments as set forth above. In addition, the scene map may be labeled with the current position of the first virtual object in the map, and the game player may manipulate the first virtual object to perform each of the pending tasks in a preset position in the scene map according to the task bar's pending task information and the scene map.

The second game task phase is a discussion phase. As shown in FIG. 2, a "Discussion" control may also be displayed in the game interface. During the first game task phase, the game player may trigger the game into the second game task phase by touching the "Discussion" control when each virtual object is in the process of acting. In some possible embodiments, each game player has a certain number of triggers for the "Discussion" control, all game players have a certain number of triggers for the "Discussion" control, and there is a cooling interval between two adjacent triggers. For example, if it is required 1-minute interval between two discussions, the game player will not be able to trigger the "Discussion" control even if the game player still has the number of times to trigger the "Discussion" control, as it is currently less than 1 minute since the last discussion was held. The specific way of triggering the discussion control and the triggering rules may be flexibly adjusted according to the user's requirements, and are not limited by the embodiments as set forth above.

FIG. 3 shows a game interface corresponding to the destructive layer. The task bar in the game interface is used to display the pending tasks of the destructive player, and the pending tasks of the destructive player are to track down and seal all the people. In addition, when the destructive player performs the above tasks, he/she may complete camouflage tasks in this mode, i.e., the destructive player may camouflage himself/herself by performing the pending tasks of the ordinary player. The scene map corresponding to the destructive player may also include a "Click on the map to destroy" control, by clicking on which the destructive player may be transported to the position on the map corresponding to the clicking operation to perform destruction. In addition, there is also a "Seal" control on the game interface of the destructive player. If there is an ordinary player within a preset range of the destructive player, the destructive player may use this control to seal the virtual character corresponding to the ordinary player; and if the destructive player has sealed the virtual characters corresponding to all of the ordinary players, the destructive player's camp will win; otherwise, if not all of the ordinary players have been sealed, and if the ordinary players have finished all the pending tasks within the specified time, the ordinary player's camp will win.

S102, responding to a movement operation for the first virtual object, and controlling a range of the virtual scene displayed in the game interface to change according to the movement operation.

During the game process, the game player may control the first virtual object to move in the virtual scene through a movement operation on the first virtual character, for example, through a sliding operation in the virtual scene to control the first virtual object to move according to the sliding operation, or to control the first virtual object to move through clicking a position of a direction operation/movement operation in the virtual scene, wherein, with the movement of the first virtual object, the range of the virtual scene displayed in the game interface is also changed.

S103, acquiring an image of a preset range of a current game interface in response to a record command triggered in the first game task phase.

Continuing to refer to FIGS. 2 and 3, the current game interface also includes controls for recording, such as a camera control, through which a record command is triggered. In response to a trigger operation by the game player on the camera control, the current game interface within a preset range will be acquired as an image captured by a camera.

In some other possible embodiments, the user may also trigger the record command through a preset shortcut, for example, by double-clicking the screen or sliding two fingers inward at the same time and other shortcuts, in order to trigger the acquisition of the image of the preset range of the current game interface. It should be understood that the above embodiments are only exemplary illustrations, and that the specific record command triggering method may be flexibly adjusted according to the user's requirements, and is not limited by the embodiments as set forth above.

In some possible embodiments, the image of the preset range of the current game interface may, for example, include: an image of a preset shape acquired with the first virtual object as a center and a line-of-sight distance of the first virtual object as a radius. That is, the preset range may be determined according to a preset range of the field of view of the first virtual object.

In one embodiment of the present disclosure, the game interface includes an in-view scene screen determined according to a visual range of the first virtual object and an out-of-view scene screen outside the visual range: the in-view scene screen being capable of displaying a second virtual object located within the visual range, the second virtual object being in a same game match as the first virtual object. In this embodiment, the preset range is determined based on the in-view scene screen.

It should be noted that acquiring the image is equivalent to taking a picture of the scene, and the acquired image contains the scene, the virtual player, but may not contain controls, menus, and other elements that are not related to the scene, so as to facilitate the game player to view the image subsequently to recall the scene at that time.

S104, storing the image.

Here, the stored image is a reasoning record image of the first virtual object. After acquiring the image of the preset range of the current game interface in response to the record command, the acquired image is stored, which facilitates the game player to view or analyze the content of the image according to the acquired image, so as to restore the memory according to the image, i.e., to help the game player to memorize the game process of the first game task phase with the aid of the stored image.

In this embodiment of the present disclosure, the acquired image is stored in a folder corresponding to the current game in the terminal device. In some possible embodiments, the folder may be automatically cleaned at regular intervals, such as automatically cleaning the images stored in the folder after the end of each round of the game; or it may be cleaned manually by the user, e.g., the user cleans the cache of the current game to clean the images stored in the folder, wherein manually cleaning the cache will not clean up the images stored in the game which is currently in progress. It should be understood that the above embodiments are only exemplary illustrations, and the specific method of cleaning images may be flexibly adjusted according to the user's requirements, and is not limited by the embodiments as set forth above.

S105, displaying the image in response to a view command triggered in a second game task phase.

Here, the second game task phase and the first game task phase are different task phases in a game match that the first virtual object is currently in.

With the method for recording the scene in the game provided in the present disclosure, after displaying the game interface on the graphical user interface, for the movement operation on the first virtual object, the range of the virtual scene displayed in the game interface is controlled to change according to the movement operation: when the first virtual object is in the first game task phase, in response to the triggered record command, the image of the preset range of the current game interface is acquired and stored; and the image stored in the first game task phase is displayed in response to the triggered view command in the subsequent second game task phase, so that the game players may help themselves memorize the game progress by storing images during the first game task phase, and analyze in the second game task phase based on the images stored in the first game task phase, thus assisting the game player's memory by means of images, and solving the problem of poor memory effect caused by the game player relying on his or her own memory.

It should be noted that in one embodiment, after triggering the record command, the images are stored directly, and the game player may be unaware of it, i.e., no preview is required either.

In some embodiments, on the basis of the above embodiments, the present disclosure may further provide a method for recording a scene in a game, the implementation process of which will be illustrated as follows with reference to the drawings. FIG. 4 is a flowchart of a method for recording a scene in a game provided by some embodiments of the present disclosure. As shown in FIG. 4, before S104, the method may further include the following steps.

S106, displaying a preview screen of the image.

Figure 5:
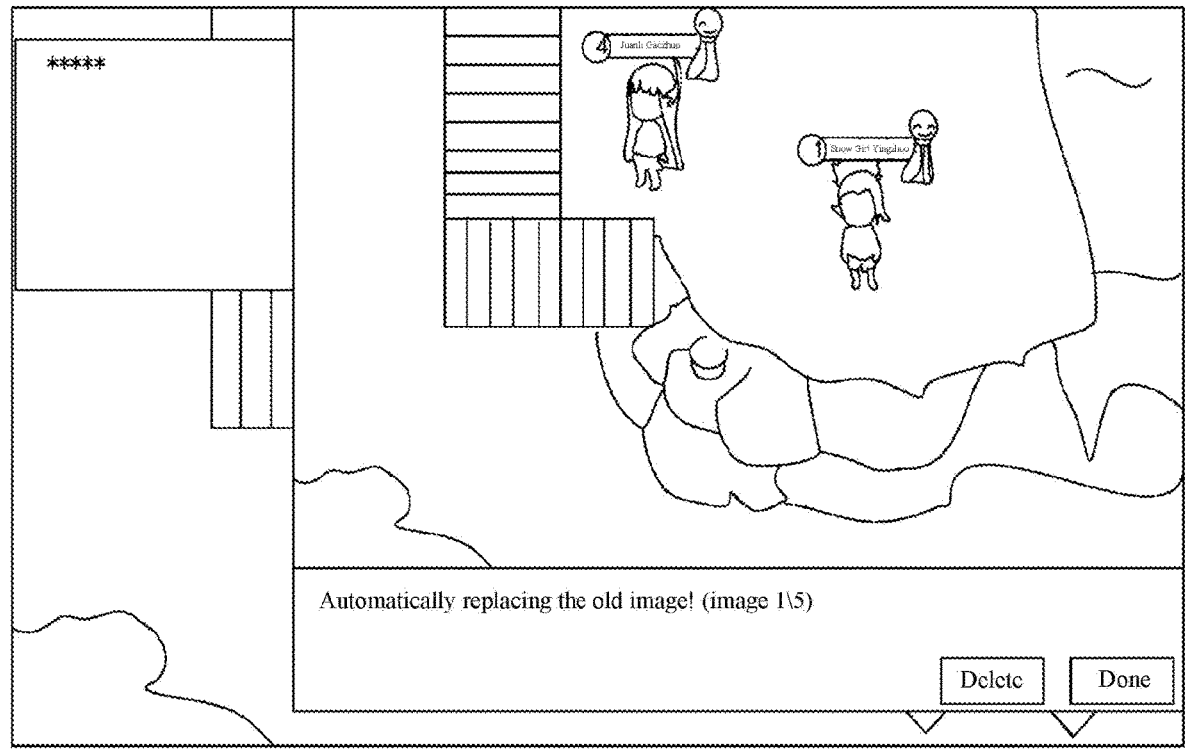
FIG. 5 is a schematic diagram of an image of a current game interface provided by some embodiments of the present disclosure.

FIG. 5 is a schematic diagram of an image of a current game interface provided by some embodiments of the present disclosure. As shown in FIG. 5, a preview screen of the image may be displayed before storing the image, and the game player may view the preview screen to determine whether the current image needs to be stored. For example, a "Delete" control or a "Done" control may be displayed at the bottom of the preview screen. If the game player clicks on the "Delete" control, it means that the current image may not need to be stored due to the fact that the content of the currently captured image is not what the game player wants, or the currently captured image may be a duplicate, etc., so that no storage of the image is required, and the virtual scene interface of the first game task phase is restored directly, and then a game interface image is acquired in response to the next capture operation of the game player. If the game player clicks on the "Done" control, the current image is stored in response to the trigger operation on the "Done" control.

When the image contains an additional virtual object other than the first virtual object, S107 is performed.

S107, acquiring attribute tagging information for the additional virtual object in response to a tagging operation on the additional virtual object in the preview screen.

Here, the attribute tagging information includes presumed identity information for the additional virtual object.

Continuing to refer to FIG. 5, in this embodiment, in addition to displaying the preview screen of the image in the current game interface, an attribute tagging control may be provided. The attribute tagging control includes at least one attribute tag. When the image contains the first virtual object "Juanli Gaozhuo" and an additional virtual object "Snow Girl Yingzhuo", and the bottom of the image also shows attribute tagging controls "Ordinary Student" and "Disciplinary Officer", the game player may perform the tagging operation on the additional virtual object other than the first virtual object according to his/her own judgment, in order to presume the identity information of the other virtual objects.

In some possible embodiments, the the attribute tagging information may be acquired for the additional virtual object in response to the tagging operation that moves a target tag in the at least one attribute tag to the additional virtual object. For example, if the game player thinks that the "Snow Girl Yingzhuo" in the current image is a disciplinary officer, the game player may determine the "Disciplinary Officer" as the target tag, and select the tag of the "Disciplinary Officer" and drag the attribute tag of the "Disciplinary Officer" to the vicinity of the "Snow Girl Yingzhuo" to determine the "Disciplinary Officer" as the attribute tagging information for the virtual object "Snow Girl Yingzhuo", so as to complete the tagging of the virtual object "Snow Girl Yingzhuo" with the identity information.

In some possible embodiments, after acquiring the attribute tagging information for the additional virtual object, the attribute tag may be displayed within a preset range of the tagged additional virtual object; and in response to an undo move operation, the attribute tagging information for the additional virtual object is deleted after moving the attribute tag a preset distance away from the tagged additional virtual object.

Of course, without being limited to the above embodiments, the virtual object may also be tagged by entering tag content, or by clicking on a target tag.

For example, in some possible embodiments, after the game enters the second game task phase, the virtual objects of all game players in the current virtual scene are displayed on the graphical user interface. In this case, the attribute tagging information corresponding to the tagged virtual object may be displayed within a preset range of the tagged virtual object in the current virtual scene, according to the attribute tagging information corresponding to a reasoning record image closest to the current time.

Figure 6:
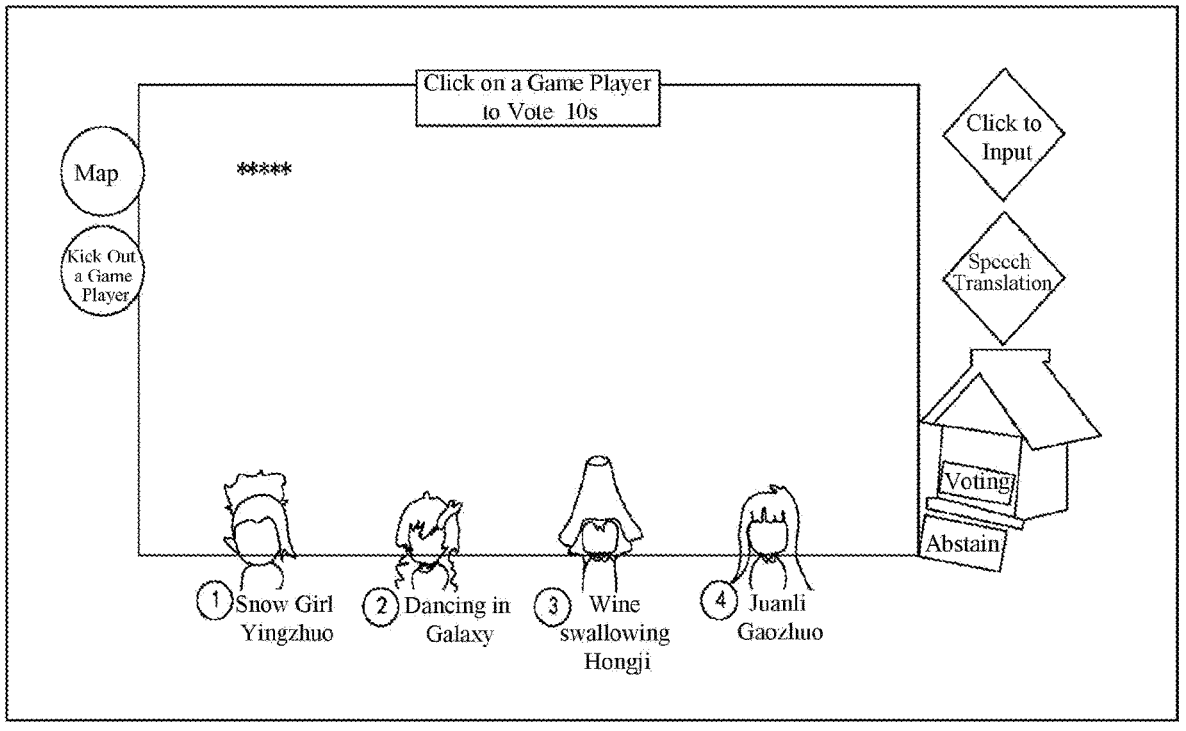
FIG. 6 is a schematic diagram of an image in a preset range of a current game interface provided by some embodiments of the present disclosure.

FIG. 6 is a schematic diagram of an image in a present range of a current game interface provided by some embodiments of the present disclosure. As shown in FIG. 6, after the game enters the second game task phase, the game interface may include a discussion display interface and a virtual object display interface. The discussion display interface is used to display the current discussion progress, for example, "4 Juanli Gaozhuo initiated an emergency discussion" may be displayed, or the vote type of each vote may also be displayed, that is, the voting information of each virtual object may be displayed, which may be used by the game players to analyze the identity of each virtual object. In addition, at the top of the discussion display interface, a voting reminder message may also be displayed, which is used to remind game players how to vote and the remaining time for the current voting phase. During the voting phase, each game player may click on the icons of other virtual objects except the first virtual object corresponding to him/her, and the virtual object clicked on is the object of his/her vote, or he/she may click on an "Abstain" control in the game display interface to abstain from the voting.

Continuing to refer to FIG. 6, respective virtual objects in the virtual object display interface may be sequentially displayed in a preset virtual object display interface according to the serial numbers of the respective virtual objects, and attribute tagging may be performed on the respective virtual objects according to the respective reasoning record images stored by the first virtual object. If the same virtual object is tagged in a plurality of reasoning record images, the attribute tagging information corresponding to the virtual object is displayed according to the attribute tagging information in the reasoning record image whose storage time is the closest to the current time, thereby preventing multiple times of tagging of the same virtual object with different attribute tagging information, which may results in tagging conflicts, and affect the game player's judgment.

Figure 7:
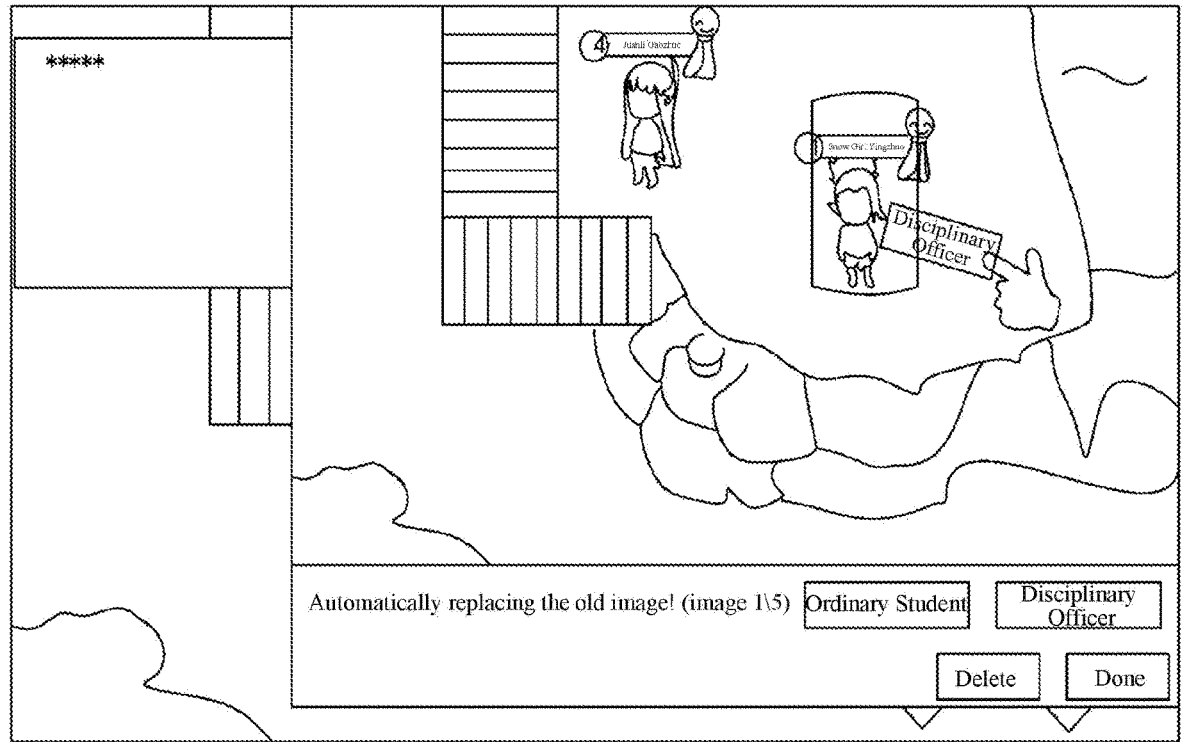
FIG. 7 is a schematic diagram of an image in a preset range of a current game interface provided by some embodiments of the present disclosure.
Figure 8:
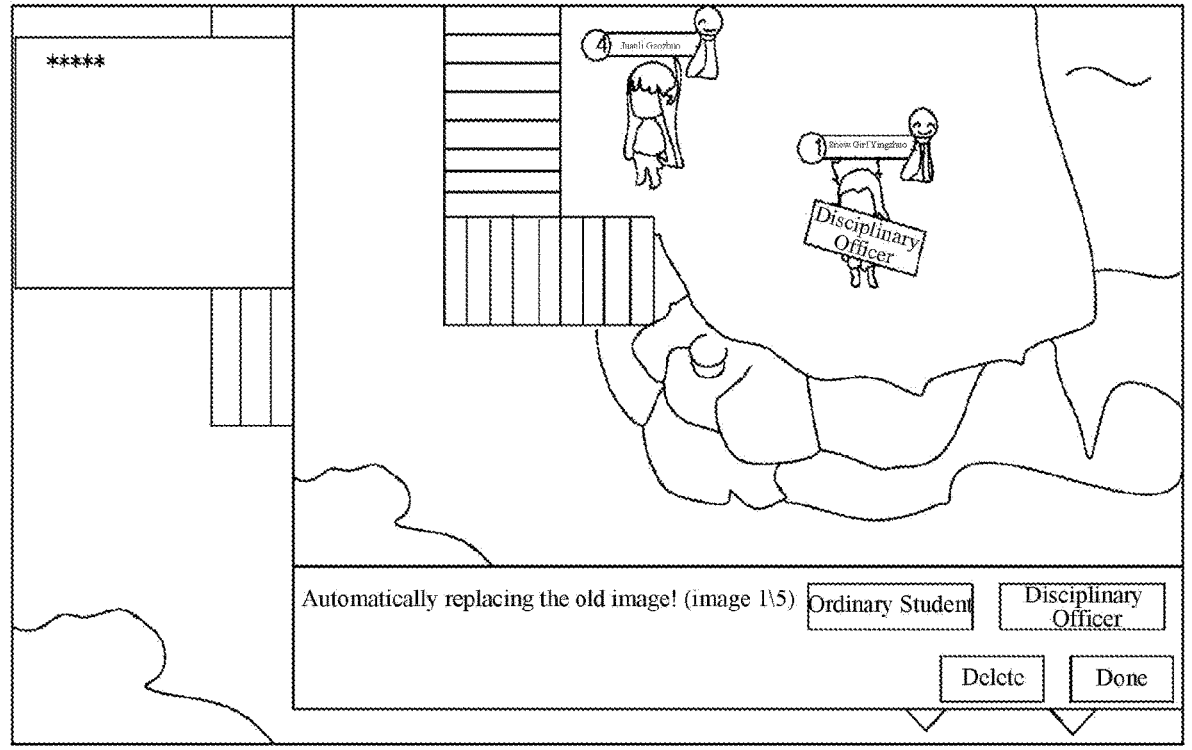
FIG. 8 is a schematic diagram of an image in a preset range of a current game interface provided by some embodiments of the present disclosure.

FIG. 7 is a schematic diagram of an image in a preset range of a current game interface provided by some embodiments of the present disclosure. FIG. 8 is a schematic diagram of an image in a preset range of a current game interface provided by some embodiments of the present disclosure. The preset range may be, for example, a rectangular area or a circular area range of the screen occupied by the virtual object.

In FIG. 7, the preset range is a cylindrical area. As shown in FIG. 8, upon completion by the game player of tagging the identity information of the virtual object "Snow Girl Yingzhuo", an attribute tag of the tagged "Disciplinary Officer" is displayed within the preset range of the virtual object "Snow Girl Yingzhuo". In some possible embodiments, the attribute tag is moved to a preset distance away from the tagged additional virtual object, for example, after the attribute tag is completely out the preset range, the attribute tagging information for the additional virtual object is determined to be deleted. It should be understood that the above embodiments are only exemplary illustrations, and the setting of the specific preset range and preset distance may be flexibly adjusted according to the user's requirements, and are not limited by the embodiments as set forth above.

In other possible embodiments, for example, the game player may click on the virtual object to be tagged in the image, and then an attribute tagging control will pop up in the image. The attribute tagging control may include a plurality of attribute tags, and the game player may select one from at least one attribute tag popped up as the attribute tag for the virtual object to be tagged, and the tagging of the identity information of the virtual object is thus completed. It should be understood that the above embodiments are only exemplary illustrations, and the specific contents of the attribute tag, the position of the attribute tagging control in the image, and the realization of the tagging operation may be flexibly adjusted according to the user's requirements, and are not limited by the embodiments as set forth above.

Figure 9:
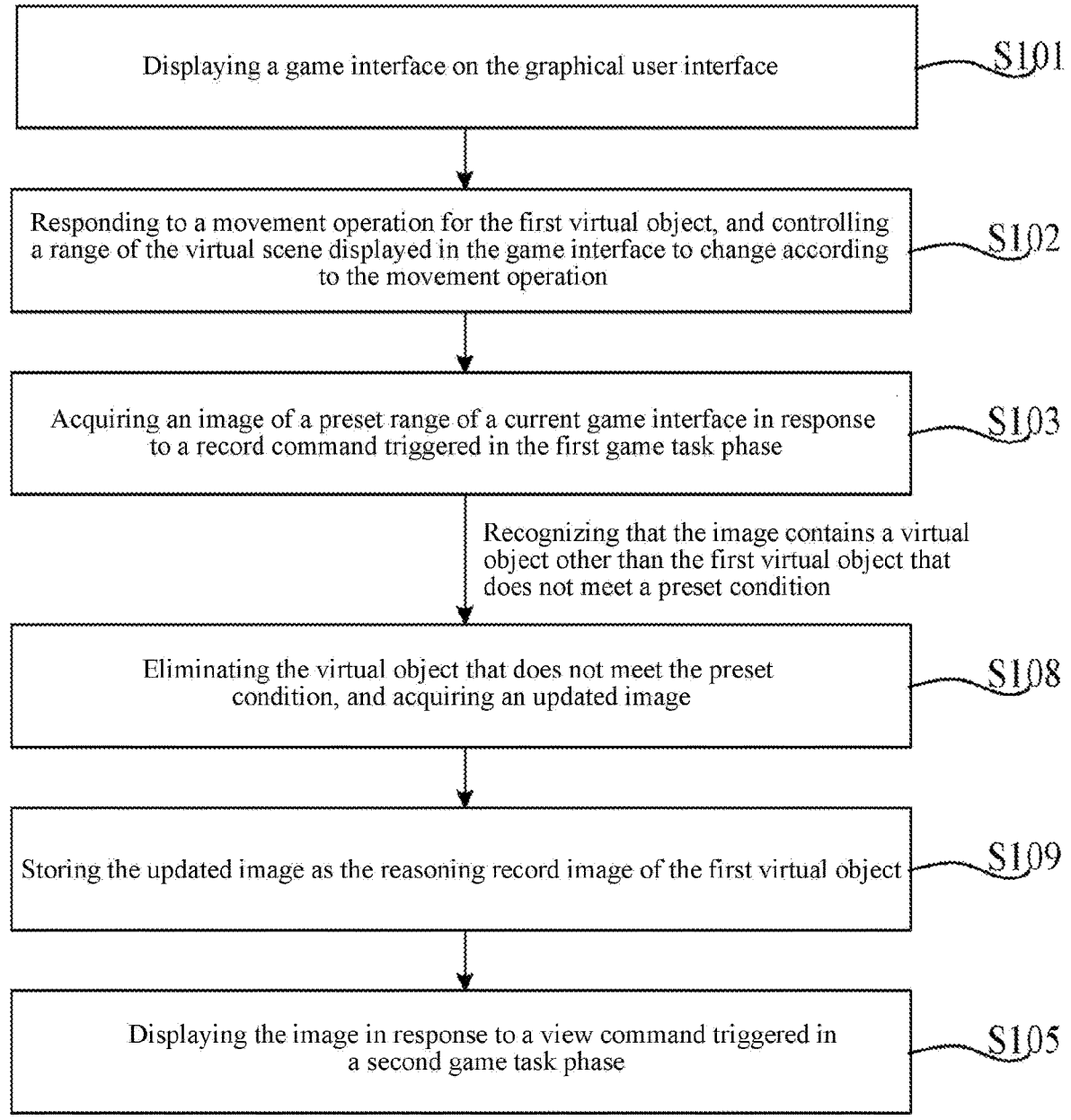
FIG. 9 is a flowchart of a method for recording a scene in a game provided by some embodiments of the present disclosure.

In some embodiments, on the basis of the above embodiments, the present disclosure may further provide a method for recording a scene in a game, and the realization process of storing an image in the above method is exemplarily described as follows in conjunction with the accompanying drawings. FIG. 9 is a flowchart of a method for recording a scene in a game provided by some embodiments of the present disclosure. As shown in FIG. 9, S104 may include: recognizing that the image contains a virtual object other than the first virtual object that does not meet a preset condition, and performing S108.

S108, eliminating the virtual object that does not meet the preset condition, and acquiring an updated image.

Here, the virtual object that does not meet the preset condition includes a virtual object having an exposed area in a current virtual scene that is less than a preset proportion of the virtual object's own area. That is, if the exposed area of the virtual object in the current virtual scene is too small for the virtual object to be easily detected, the virtual object will not be displayed, thus avoiding that the exposed area of the virtual object is too small, which may render the game player unable to determine the identity of the virtual object based on the exposed area, and also avoiding any unfairness in the game. Therefore, directly not displaying such virtual objects has the effect of enhancing the game player's gaming experience.

S109, storing the updated image as the reasoning record image of the first virtual object.

In one embodiment of the present disclosure, the recognition is automatic, and upon recognizing an image that does not meet the preset condition, the image is not provided to the game player for preview; but an updated image is directly acquired, and a preview image of the updated image is displayed to the game player if the updated image meets the preset condition, after which the game player confirms and stores the updated image as the reasoning record image of the first virtual object.

Figure 10:
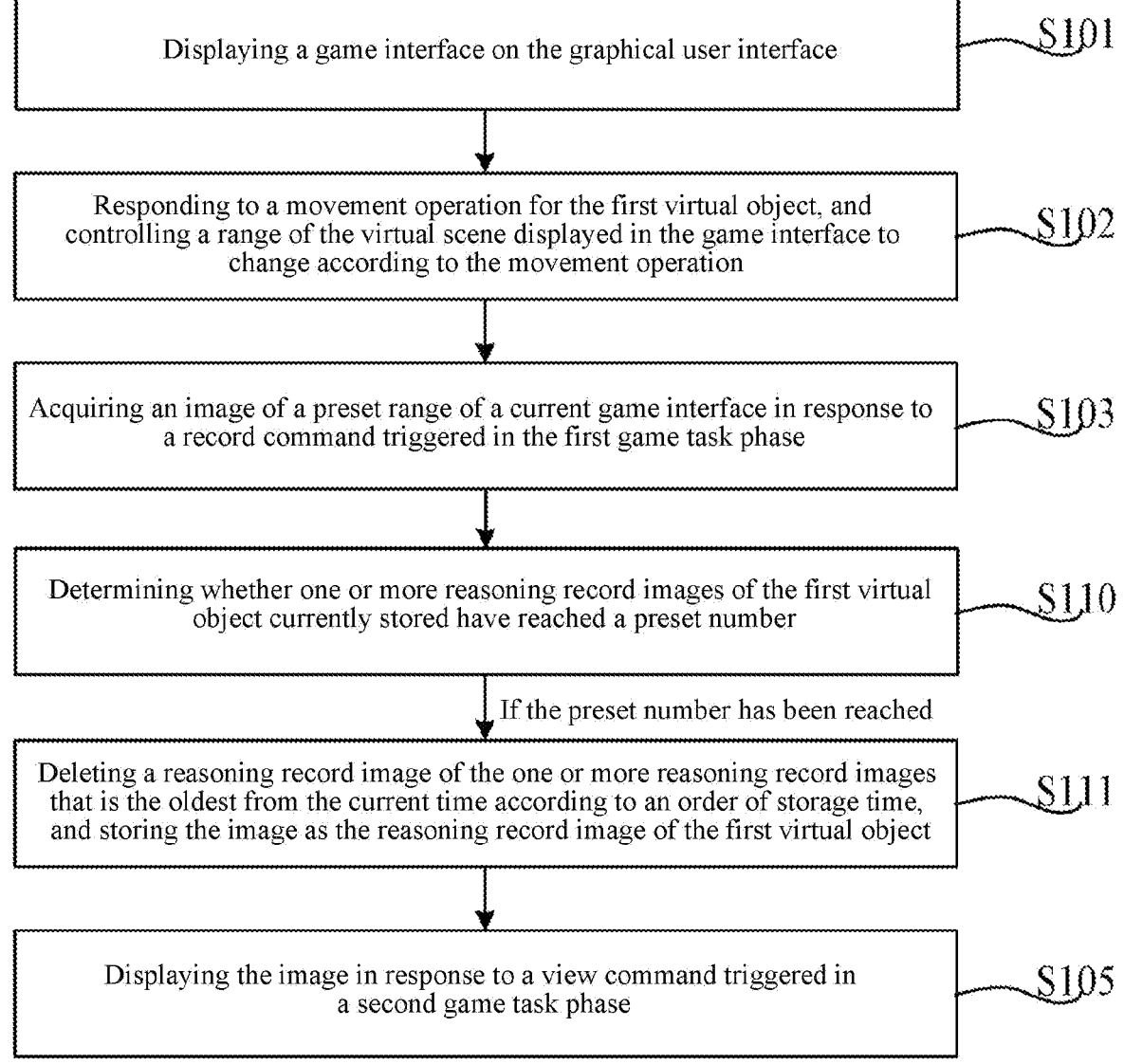
FIG. 10 is a flowchart of a method for recording a scene in a game provided by some embodiments of the present disclosure.

In some embodiments, on the basis of the above embodiments, the present disclosure may further provide a method for recording a scene in a game, and the realization process of storing an image in the above method is exemplarily described as follows in conjunction with the accompanying drawings. FIG. 10 is a flowchart of a method for recording a scene in a game provided by some embodiments of the present disclosure. As shown in FIG. 10, S104 may include the following steps.

S110, determining whether one or more reasoning record images of the first virtual object currently stored have reached a preset number.

Here, each game player is limited to store only a preset number of reasoning record images, and this way of storing only a preset number of reasoning record images not only may have the effect of saving memory, but also ensures the timeliness of the record. If the preset number has been reached, S111 will be performed.

S111, deleting a reasoning record image of the one or more reasoning record images that is the oldest from the current time according to an order of storage time, and storing the image as the reasoning record image of the first virtual object.

In some embodiments, on the basis of the above embodiments, the stored image may be clicked on and viewed by the game player during the first game task phase and the second game task phase.

FIG. 11 is a flowchart of a method for recording a scene in a game provided by some embodiments of the present disclosure. As shown in FIG. 11, S105 may include the following steps.

S112, in response to a first image view control operation in the first game task phase, displaying a thumbnail of at least one reasoning record image currently stored.

Figure 12:
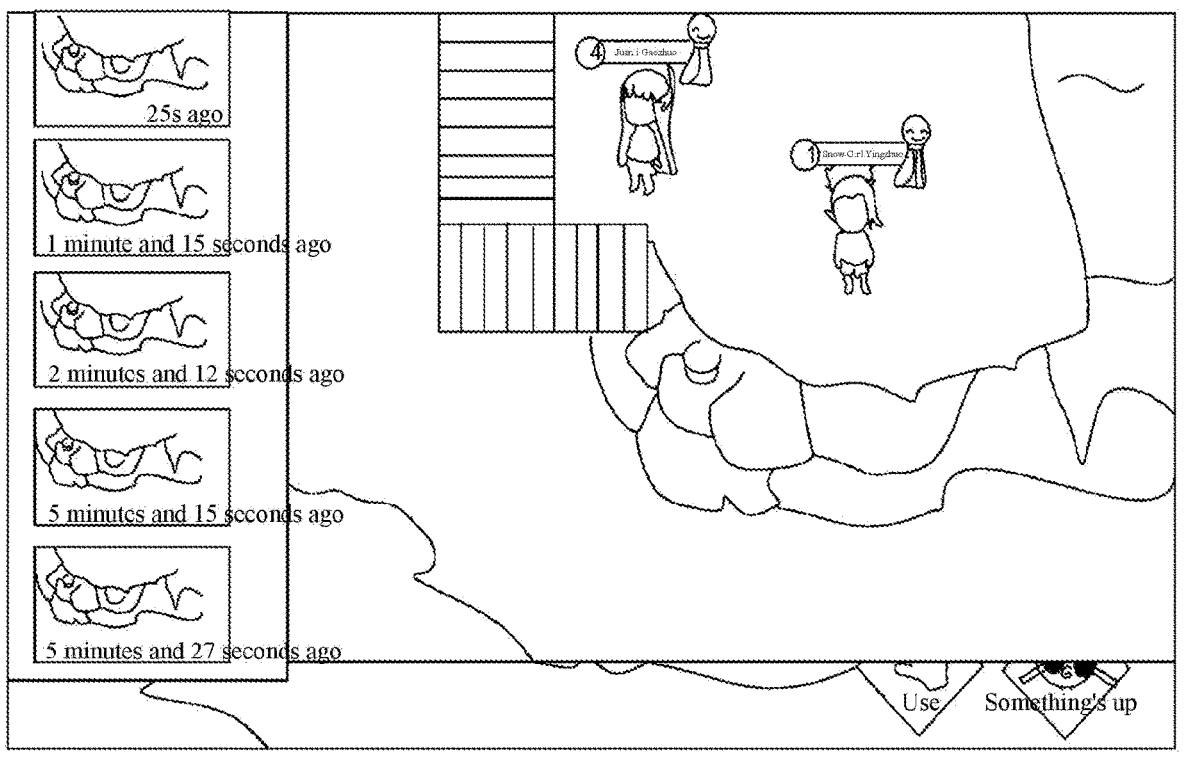
FIG. 12 is a schematic diagram of a game interface image provided by some embodiments of the present disclosure.

FIG. 12 is a schematic diagram of a game interface image provided by some embodiments of the present disclosure. As shown in FIG. 12, in response to the first image view control operation in the first game task phase, a thumbnail display interface and a standard display interface are displayed in the game interface image. The thumbnail display interface shows the thumbnail(s) of the at least one reasoning record image currently stored. The standard display interface, for example, may be displayed next to the thumbnail display interface, showing a standard image corresponding to a target thumbnail (cf. FIG. 12 showing a column of thumbnails on the left and a standard image on the right).

Here, the target thumbnail is determined based on the user's selection and in the case where the user does not make a selection, for example, when initially viewing, an image stored at a time closest to the current time may be defaulted to be the target thumbnail. Taking FIG. 12 as a reference, a first image of the at least one reasoning record image is defaulted to be the target thumbnail. It should be understood that the specific default display may be flexibly adjusted according to the user's requirements, and is not limited by the embodiments as set forth above.

In some possible embodiments, the display order of the respective reasoning record images may be sorted, for example, based on the storage time order, with the display of the reasoning record images whose storage time is closer to the current time being more forward, and the display of the reasoning record images whose storage time is farther away from the current time being more backward. On the basis of displaying the thumbnail(s) of the at least one reasoning record image and the standard image corresponding to the target thumbnail, the thumbnail of each reasoning record image in the game interface image may also be displayed with capture time information and/or position coordinate information of the captured reasoning record image.

Figure 13:
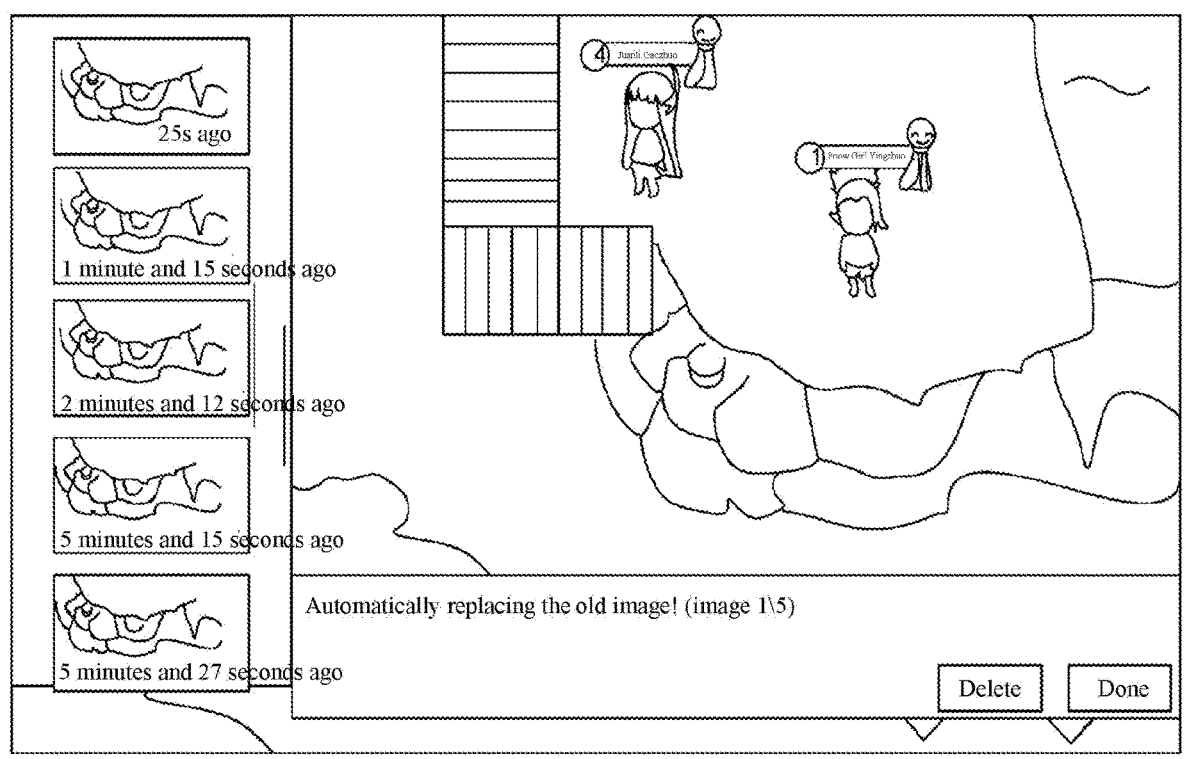
FIG. 13 is a schematic diagram of a game interface image provided by some embodiments of the present disclosure.

FIG. 13 is a schematic diagram of a game interface image provided by some embodiments of the present disclosure. As shown in FIG. 13, still taking the order of arrangement of the thumbnails of the reasoning record images as determined based on the capture time information as an example for illustration, in some possible embodiments, a "Delete" control and a "OK" control may be displayed at a preset position in the standard image corresponding to the target thumbnail, for example, at the bottom of the standard image. When the game player clicks on the "Delete" control, it triggers the deletion of the reasoning record image corresponding to the standard image in the stored images. In an example, to prevent accidental deletion, after the game player clicks on the "Delete" control, a confirmation window will pop up, through which the game player will confirm whether or not he or she wants to delete the currently selected reasoning record image, and if it is confirmed through the confirmation window that the game player wants to delete the reasoning record image, the reasoning record image will be deleted from the stored images and will no longer be displayed.

When the game player clicks the "OK" control, it is determined that the current image is correct, and then the next image of the current image may be automatically displayed, or the virtual scene interface may be automatically returned. The specific return content and return mode after clicking each control may be flexibly adjusted according to the user's requirements, and are not limited by the embodiments as set forth above.

Continuing to refer to FIG. 13, if the number of stored images has reached the preset number, a reminder message may be displayed at a preset position of the scene interface image, for example, at the bottom of the scene interface image, to remind the user that the number of stored images has reached the preset number. For example, "Automatically replacing the old image 5\5" may be displayed to indicate that the current preset number is 5, and the number of stored images is also 5, and in this case a newly stored image will automatically replace an old image. In addition, "Will be cleared next time" may be displayed on the thumbnail of a reasoning record image at the end of the sorting list to remind the game player that the reasoning record image at the end of the sorting list will be cleared when a new reasoning record image is saved next time, so that the game player may be prompted to check the content of the reasoning record image at the end of the sorting list in time. If the content of the reasoning record image is important, the game player may ensure that the stored images will not reached the preset number of stored images by deleting other reasoning record images from the stored images, so that when the game player performs the image storage again, the reasoning record image at the end of the sorting list will not be deleted. This further enhances the game player's gaming experience, and prevents the game player from noticing that the stored images have been full when he/she views them, which may cause the deletion of the images that he/she does not want to be deleted.

Figure 14:
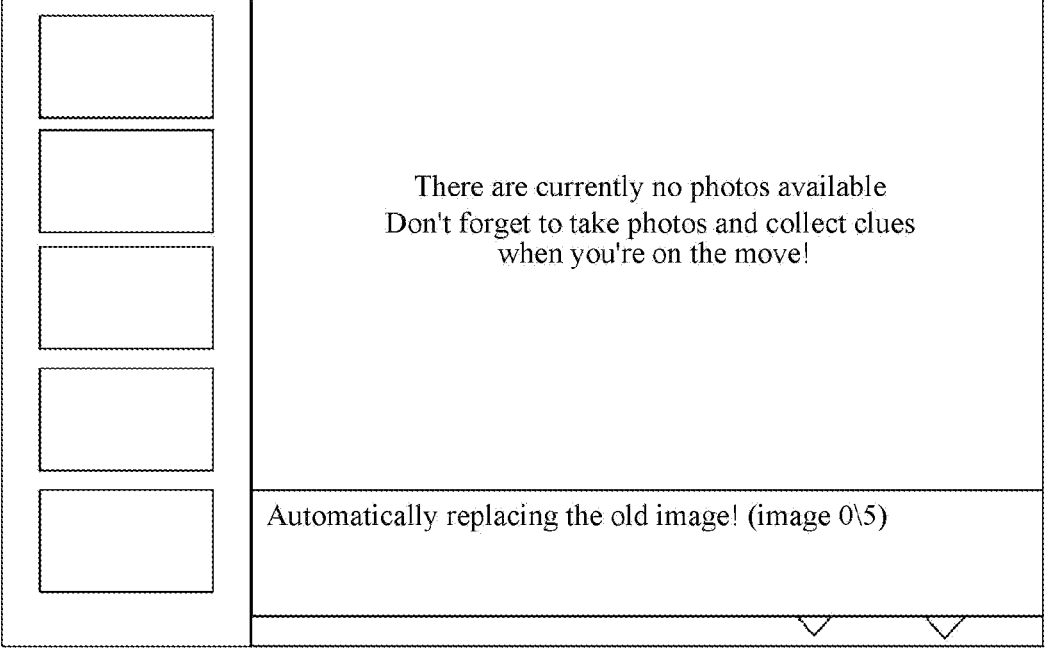
FIG. 14 is a schematic diagram of a game interface image provided by some embodiments of the present disclosure

FIG. 14 is a schematic diagram of a game interface image provided by some embodiments of the present disclosure. If there is no reasoning record image in the image storage, the current game interface image is shown in FIG. 14, in which case a reminder message is displayed at a preset position of the scene interface image, for example, at the bottom of the scene interface image, to remind the user that the number of currently stored images is 0. For example, "Automatically replacing the old image 0\5" may be displayed to indicate that the current preset number is 5, and the number of stored images is 0, and in this case a newly stored image will automatically replace an old image, the content of each thumbnail in the thumbnail display interface is empty, and a reminder message is displayed in the standard display interface, prompting the game player that there are currently no photos available.

S113, in response to a selection operation on a target thumbnail in the thumbnail, displaying a standard image corresponding to the target thumbnail.

Figure 15:
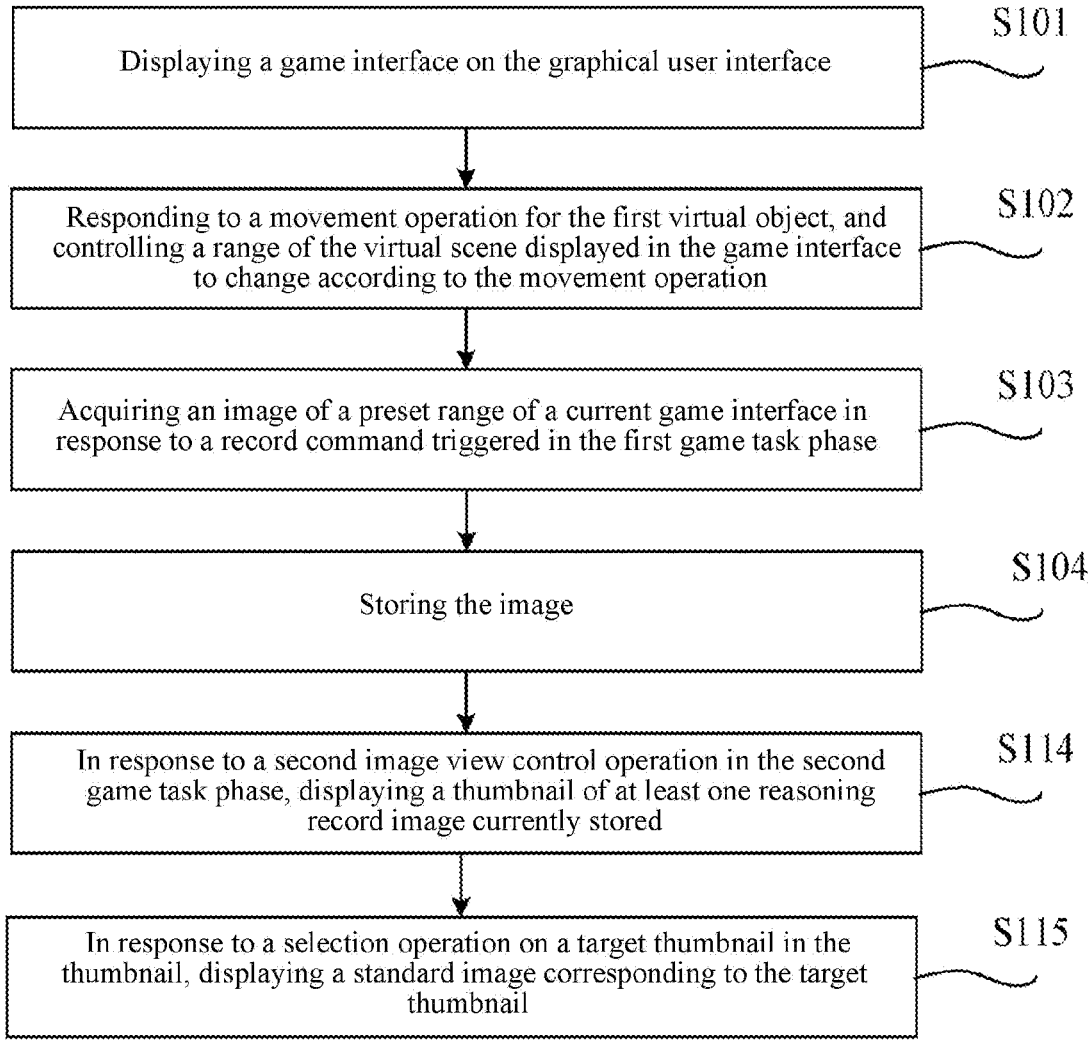
FIG. 15 is a flowchart of a method for recording a scene in a game provided by some embodiments of the present disclosure.

In some embodiments, on the basis of the above embodiments, the present disclosure may further provide a method for recording a scene in a game, and the realization process of displaying an image in the second game task phase of the above method is exemplarily described as follows in conjunction with the accompanying drawings. FIG. 15 is a flowchart of a method for recording a scene in a game provided by some embodiments of the present disclosure. As shown in FIG. 15, S105 may include the following steps.

S114, in response to a second image view control operation in the second game task phase, displaying a thumbnail of at least one reasoning record image currently stored.

Figure 16:
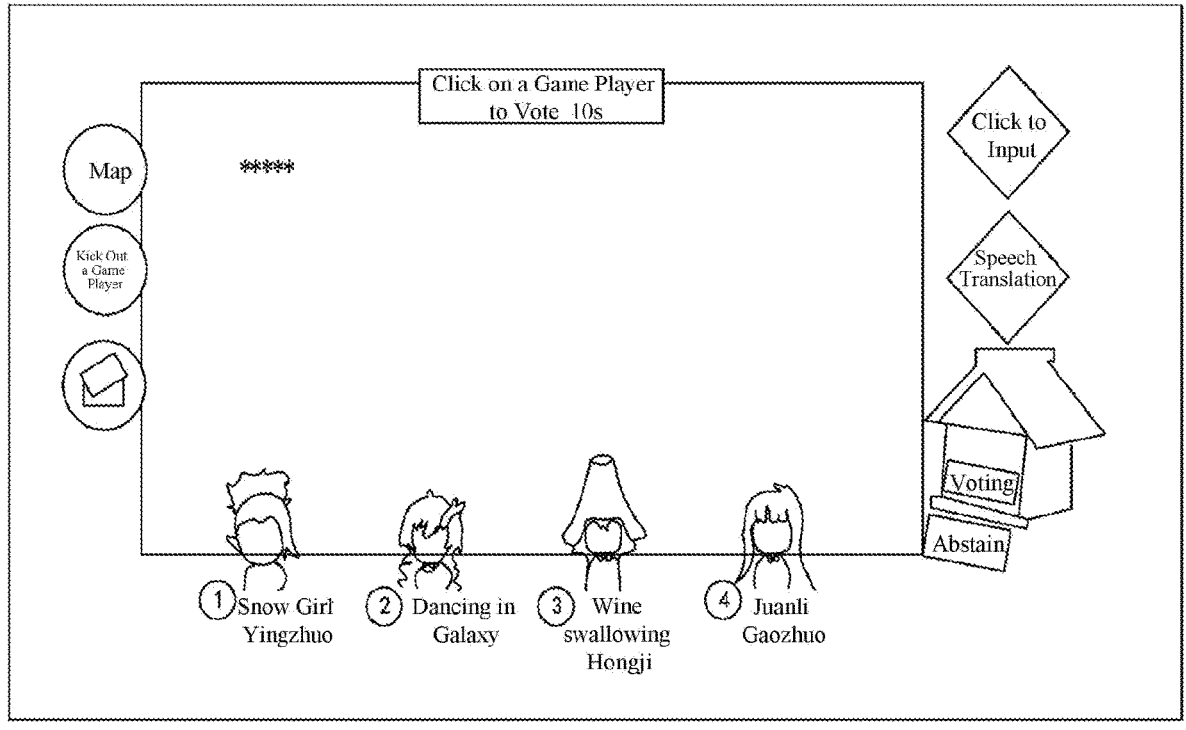
FIG. 16 is a schematic diagram of a game interface image provided by some embodiments of the present disclosure.

FIG. 16 is a schematic diagram of a game interface image provided by some embodiments of the present disclosure, wherein, on the basis of FIG. 6, after the game enters the second game task phase, the game interface may include, in addition to the discussion display interface and the virtual object display interface, a second image view control, by clicking on which, the user may view the reasoning record image stored.

Exemplarily, the game interface image of FIGS. 12-14 will be displayed if the viewing of the stored reasoning record image is triggered by the user clicking on the second image view control after the game enters the second game task phase. That is, regardless of the game task phase, whenever the player triggers the image view control, the layout of the game interface image displayed for viewing the stored reasoning record image is the same, except that the content of the reasoning record image specifically included within the game interface is displayed according to the content actually stored through the first virtual object.

Exemplarily, in some possible embodiments, in response to an operation on a second image view control in the second game task phase, displaying a thumbnail of at least one reasoning record image currently stored, wherein corresponding capture time information and/or position coordinate information is displayed at a preset position of the thumbnail.

S115, in response to a selection operation on a target thumbnail in the thumbnail, displaying a standard image corresponding to the target thumbnail.

Exemplarily, when viewing the image, either in the first game task phase, or in the second game task phase, the attribute tagging information corresponding to the tagged virtual object may be further displayed within a preset range of the tagged virtual object in the standard image in some possible embodiments. Of course, it is also possible to display the attribute tagging information for the image tagged at the time on the thumbnail, such as displaying the attribute tagging information corresponding to the tagged virtual object at the bottom or side of the thumbnail, without specific limitations herein.

With the method for recording a scene in a game provided by the present disclosure, not only may the reasoning record image be acquired by taking a picture to assist the game player in memorizing, but the game player may also perform attribute tagging on other virtual objects except the first virtual object in the acquired reasoning record image, and view the reasoning record image acquired in the first game task phase during the second game task phase, which may assist the game player in recalling the scene of the first game task phase. In addition, the attribute tags on each reasoning record image may also facilitate the discussion and voting sessions to help other game players determine the identity information of each virtual object, which improves the game player's gaming experience and helps the game player to solve the problem of ineffective game memorization.

A specific embodiment of a game match is provided below, in which, as described in the above embodiment, there are usually two game phases in a game match: an action phase and a discussion phase. Based on these two game phases, this embodiment provides various functions in a game match as described below.

A specific embodiment of a game match is provided below, in which, as described in the above embodiment, there are usually two game phases in a game match: an action phase and a discussion phase. Based on these two game phases, this embodiment provides various functions in a game match as described below. In the action phase, there are usually functions one to eight. In the discussion phase, there are usually functions one, two and seven.

Function One. This embodiment provides a display function of a virtual map. In response to a movement operation on a first virtual object, the first virtual object is controlled to move in a first virtual scene, and a range of the first virtual scene displayed in a graphical user interface is controlled to change according to the movement of the first virtual object correspondingly; and in response to a preset triggering event, the virtual scene displayed in the graphical user interface is controlled to be switched from the first virtual scene to a second virtual scene, wherein the second virtual scene includes at least one second virtual object.

In this embodiment, the description is made from the perspective of a first virtual object having a target identity: A first virtual scene is first provided in the graphical user interface, as shown in FIGS. 2-3, in which the virtual object may move, or perform a game task, or perform other interactive operations. The user triggers a movement operation for the first virtual object to control the movement of the first virtual object in the first virtual scene, and in most cases, the first virtual object is located in a position at a relative center of a range of the first virtual scene displayed in the graphical user interface. The virtual camera in the first virtual scene follows the movement of the first virtual object, which in turn causes the range of the first virtual scene displayed in the graphical user interface to change in correspondence to the movement of the first virtual object.

The virtual objects participating in the current game match are in the same first virtual scene, therefore, during the movement of the first virtual object, if the first virtual object is closer to the other virtual objects, there may be other virtual objects entering into the range of the first virtual scene displayed in the graphical user interface, which are characters controlled by the other players. As shown in FIGS. 2-3, there are two nearby virtual objects displayed in the range of the first virtual scene, in addition to which there is displayed in the graphical user interface a movement control for controlling the movement of the first virtual object, a plurality of attack controls, and a discussion control. The discussion control may be used to control the virtual objects to enter the second virtual scene.

When the user controls the first virtual object to move in the first virtual scene, the user may determine the target virtual object from a plurality of second virtual objects in a survival state. The plurality of second virtual objects in the survival state may refer to the virtual objects in the survival state other than the first virtual object in the current game match. Specifically, the user may determine the target virtual object based on the position, behavior, etc. of each of the second virtual objects. For example, the user selects a virtual object as the target virtual object that is relatively isolated and is not easily detected by other virtual objects when attacking. After the target virtual object is determined, a specific virtual object may be controlled to move from an initial position in the first virtual scene to the position of the target virtual object and specified operations may be performed on the target virtual object, and then the target virtual object enters a target state.

The second virtual scene is displayed in the graphical user interface upon the triggering of the preset triggering event. For example, the triggering event may be a specific trigger operation, which may be performed by any virtual object in the survival state. For example, in FIGS. 2-3, the second virtual scene may be displayed in the graphical user interface by triggering the discussion control, thereby realizing that the virtual scene is switched from the first virtual scene to the second virtual scene, and all virtual objects in the current game match are moved from the first virtual scene to the second virtual scene. The second virtual scene includes at least one second virtual object or an object icon of the second virtual object in addition to the first virtual object or an object icon of the first virtual object, where the object icon may be an avatar, a name, etc., of the virtual object.

In the second virtual scene, the virtual object in the survival state has the privileges to speak, discuss and vote, but the target virtual object enters the target state, resulting in at least some of the interactions configured for the target virtual object in the second virtual scene being in a restricted state. The interactions may include speaking, discussing and voting interactions, etc. The restricted state may be that a certain interaction is not allowed, or a certain interaction is not allowed within a certain period of time, or a certain interaction is limited to a specified number of times.

As shown in FIG. 6, the second virtual scene includes a plurality of virtual objects in the survival state, including the first virtual object. The first virtual object may send a discussion message through a "Click to Input" control and a "Speech Translation" control on the right side. The discussion message sent by the virtual object may be displayed on a discussion message panel, and the discussion message may include who initiated the discussion, who was attacked, the position of the virtual object that was attacked, and the position of each virtual object at the time of the initiation of the discussion, etc.

The user may vote for a virtual object by clicking on the virtual object in the second virtual scene and displaying a voting button for the virtual object in the vicinity of the virtual object. The user may also click on an abstain button to give up voting privileges for this time.

In response to a touch operation for a function control, a position marking interface is displayed in the graphical user interface, and in the position marking interface, a character identification of the at least one second virtual object and/or the first virtual object is displayed based on the position marking information reported by the at least one second virtual object and/or the first virtual object. Specific implementations of the process may be referred to in the embodiments described above.

Function Two. This embodiment provides an information display function for a virtual object. A first virtual scene and a first virtual object located in the first virtual scene are displayed in a graphical user interface: in response to a movement operation for the first virtual object, the first virtual object is controlled to move in the first virtual scene, and a range of the first virtual scene displayed in the graphical user interface is controlled to change according to the movement of the first virtual object correspondingly: in response to a note adding operation, note prompting information is displayed for at least one second virtual object in the graphical user interface; and in response to a trigger operation for the note prompting information, note information is added for a target virtual object in the displayed at least one second virtual object.

In this embodiment, the description is made from the perspective of a first virtual object having a target identity: A first virtual scene is first provided in the graphical user interface, as shown in FIGS. 2-3, in which the virtual object may move, or perform a game task, or perform other interactive operations. The user triggers a movement operation for the first virtual object to control the movement of the first virtual object in the first virtual scene, and in most cases, the first virtual object is located in a position at a relative center of a range of the first virtual scene displayed in the graphical user interface. The virtual camera in the first virtual scene follows the movement of the first virtual object, which in turn causes the range of the first virtual scene displayed in the graphical user interface to change in correspondence to the movement of the first virtual object.

The virtual objects participating in the current game match are in the same first virtual scene, therefore, during the movement of the first virtual object, if the first virtual object is closer to the other virtual objects, there may be other virtual objects entering into the range of the first virtual scene displayed in the graphical user interface, which are characters controlled by the other players, or non-player controlled virtual characters. As shown in FIGS. 2-3, there are two nearby virtual objects displayed in the range of the first virtual scene, in addition to which there is displayed in the graphical user interface a movement control for controlling the movement of the first virtual object, a plurality of attack controls, and a discussion control. The discussion control may be used to control the virtual objects to enter the second virtual scene.

When the user controls the first virtual object to move in the first virtual scene, the user may determine the target virtual object from at least one second virtual object in a survival state, and/or at least one third virtual object in a dead state. The at least one second virtual object in the survival state may refer to the virtual object(s) in the survival state other than the first virtual object in the current game match. Specifically, the user may determine the target virtual object based on the position, behavior, etc. of each of the second virtual objects. For example, the user selects a virtual object as the target virtual object that is relatively isolated and is not easily detected by other virtual objects when attacking. The user may also select a virtual object as the target virtual object that has suspicious identity information reasoned based on position, behavior, etc. After the target virtual object is determined, a specific virtual object may be controlled to move from an initial position in the first virtual scene to the position of the target virtual object, or the target virtual object may be selected so that specified operations may be performed on the target virtual object, and then the target virtual object enters a target state.

For example, in response to a note adding operation, note prompting information is displayed for at least one second virtual object in the graphical user interface; and in response to a trigger operation for the note prompting information, note information is added for a target virtual object in at least one second virtual object displayed. In this case, the note information may be displayed on the peripheral side of the target virtual object in the first virtual scene, that is, when the first virtual object is moved in the first virtual scene according to the movement operation and the range of the first virtual scene displayed in the graphical user interface is controlled to correspondingly change according to the movement of the first virtual object, if the target virtual object appears in a preset range of the first virtual object, the player may see the target virtual object as well as the note information of the target virtual object through the first virtual scene presented in the graphical user interface.

The second virtual scene is displayed in the graphical user interface upon the triggering of the preset triggering event. For example, the triggering event may be a specific trigger operation, which may be performed by any virtual object in the survival state. For example, in FIG. 6, the second virtual scene may be displayed in the graphical user interface by triggering the discussion control, thereby realizing that the virtual scene is switched from the first virtual scene to the second virtual scene, and all virtual objects in the current game match are moved from the first virtual scene to the second virtual scene. The second virtual scene includes at least one second virtual object, or a character model and an object icon of the second virtual object, in addition to the first virtual object, or a character model and an object icon of the first virtual object, where the object icon may be an avatar, a name, etc., of the virtual object.

In the second virtual scene, the virtual object in the survival state has the privilege to speak, discuss and vote, and if the target virtual object enters the target state (e.g., is added with note information), the current player may see the target virtual object and the note information of the target virtual object through the second virtual scene presented in the graphical user interface. In addition, the second virtual scene is also configured with interactions, which may include speaking and discussing interactions, voting interactions, note interactions, and the like. A restricted state may be that a certain interaction is not allowed, or a certain interaction is not allowed within a certain period of time, or a certain interaction is limited to a specified number of times. For example, a virtual character in a dead state is restricted from using voting interactions, and a virtual character in a dead state whose identity is known is restricted from using note interactions.

As shown in FIG. 6, the second virtual scene includes a plurality of virtual objects in the survival state, including the first virtual object. The first virtual object may send a discussion message through a "Click to Input" control and a "Speech Translation" control on the right side. The discussion message sent by the virtual object may be displayed on a discussion message panel, and the discussion message may include who initiated the discussion, who was attacked, the position of the virtual object that was attacked, and the position of each virtual object at the time of the initiation of the discussion, etc.

The user may vote for a virtual object by clicking on the virtual object in the second virtual scene and displaying a voting button for the virtual object in the vicinity of the virtual object. The user may also click on an abstain button to give up voting privileges for this time. Additionally, a note control may be displayed along with the voting button to add note information to the clicked virtual object based on a touch operation for the note control.

In addition, a note list may also be displayed in the second virtual scene, and the note prompting information may be displayed in the note list in order to add note information to the displayed target virtual object in response to a trigger operation for the note prompting information. Specific implementations of the process may be referred to in the embodiments described above.

Function Three. This embodiment provides a control function of a game process. In an action phase, at least part of a first virtual scene of the action phase and a first virtual object located in the first virtual scene are displayed in a graphical user interface: a skill configuration parameter of the first virtual object is acquired for determining an additional skill of the first virtual object in addition to a default character skill, the default skill being a skill assigned according to an identity attribute of the first virtual object: when it is determined that a completed progress of a virtual task in a match-up phase has reached a progress threshold, the first virtual object is controlled to unlock the additional skill, and an additional skill control is provided in the graphical user interface for triggering the additional skill in addition to a default skill control provided for triggering the default skill; and in response to a preset triggering event, the graphical user interface is controlled to display a second virtual scene corresponding to a discussion phase. The second virtual scene includes at least one of the following: a second virtual object, an object icon of the second virtual object, a first virtual object, and an object icon of the first virtual object. The discussion phase is configured to determine a game state of at least one second virtual object or the first virtual object based on the results of the discussion phase. Specific implementations of the process may be referred to in the embodiments described below.

In this embodiment of the present disclosure, the description is made from the perspective of a first virtual object having a first character attribute. A first virtual scene is first provided in the graphical user interface, as shown in FIGS. 2-3, in which the first virtual object may move, or perform a game virtual task, or perform other interactive operations. The user triggers a movement operation for the first virtual object to control the movement of the first virtual object in the first virtual scene, and in most cases, the first virtual object is located in a position at a relative center of a range of the first virtual scene displayed in the graphical user interface. The virtual camera in the first virtual scene follows the movement of the first virtual object, which in turn causes the range of the first virtual scene displayed in the graphical user interface to change in correspondence to the movement of the first virtual object.

When the user controls the first virtual object to move in the first virtual scene, the additional skill of the first virtual object added to the default character skill is determined based on the skill parameter of the first virtual object, wherein the additional skill may include at least one of the following: an identity betting skill, an identity verification skill, a guiding skill, and a task doubling skill. It is also determined the progress of the virtual task jointly completed by a plurality of other virtual objects having the same character attribute (the first character attribute) as the first virtual object in the current match-up phase, which is displayed according to the progress bar shown in FIGS. 2-3. When it is determined that the completed progress of the virtual task in the match-up phase has reached the progress threshold, the first virtual object may be controlled to unlock the additional skill, and the first virtual object utilizes the additional skill to play the game. For example, the guiding skill may be used to determine, during the action phase, the virtual object in the first virtual scene that is in a target state (e.g., dead, etc.) and within a preset distance threshold from the first virtual object, so that the first virtual object may be controlled to move to the position of the virtual object in the target state, and a discussion may be initiated immediately.

The second virtual scene is displayed in the graphical user interface upon the triggering of the preset triggering event. For example, the triggering event may be a specific trigger operation, which may be performed by any virtual object in the survival state. For example, in FIG. 6, the second virtual scene may be displayed in the graphical user interface by triggering the discussion control, thereby realizing that the virtual scene is switched from the first virtual scene to the second virtual scene, and all virtual objects in the current game match are moved from the first virtual scene to the second virtual scene. The second virtual scene includes at least one second virtual object, or an object icon of the second virtual object, in addition to the first virtual object, or an object icon of the first virtual object, where the object icon may be an avatar, a name, etc., of the virtual object.

In the second virtual scene, the virtual object in the survival state has the privilege to speak, discuss and vote. As shown in FIG. 6, the second virtual scene includes a plurality of virtual objects in the survival state, including the first virtual object. The first virtual object may send a discussion message through a "Click to Input" control and a "Speech Translation" control on the right side. The discussion message sent by the virtual object may be displayed on a discussion message panel, and the discussion message may include who initiated the discussion, who was attacked, the position of the virtual object that was attacked, and the position of each virtual object at the time of the initiation of the discussion, etc.

The user may vote for a virtual object by clicking on the virtual object in the second virtual scene and displaying a voting button for the virtual object in the vicinity of the virtual object. Before voting, the user may control the first virtual object to use the corresponding unlocked additional skill to check the virtual object of key suspicion. For example, the first virtual object may use the identity verification skill to check the identity of the virtual object of key suspicion, and based on the results of the check, determine whether to vote for the virtual object to improve the accuracy of the vote. Of course, the user may also click on an abstain button to give up voting privileges for this time.

Function Four. This embodiment provides another display function of a virtual map. In response to a movement operation, a virtual character is controlled to move in a virtual scene and the virtual scene to which the virtual character is currently moved is displayed in a graphical user interface: in response to a map display operation, a first virtual map corresponding to the virtual scene is superimposed on top of the virtual scene; and in response to a map switching condition being triggered, the first virtual map superimposed on top of the virtual scene is switched to a second virtual map corresponding to the virtual scene. A transparency of at least part of a map region of the second virtual map is higher than a transparency of a map region corresponding to the first virtual map, so that a degree of occlusion of information in the virtual scene by the virtual map after the switching is lower than a degree of occlusion before the switching.

In this embodiment, the description is made from the perspective of a virtual object controlled by a game player. A virtual scene is provided in the graphical user interface, as shown in FIGS. 2-3. In this virtual scene (e.g., the first virtual scene as shown in FIGS. 2-3), the virtual object controlled by the game player (e.g., the first virtual character and/or the second virtual character as shown in FIGS. 2-3) may move in the virtual scene, or perform a game task, or perform other interactive operations. In response to a movement operation triggered by the game player, the virtual object is controlled to move in the virtual scene, and in most cases, the virtual object is located in a position at a relative center of a range of the virtual scene displayed in the graphical user interface. The virtual camera in the virtual scene follows the movement of the virtual object, which in turn causes the virtual scene displayed in the graphical user interface to change in correspondence to the movement of the virtual object, thus the virtual scene to which the virtual character is currently moved is displayed in the graphical user interface.

The virtual objects participating in the current game match are in the same virtual scene, therefore, during the movement of the virtual object, if the virtual object is closer to the other virtual objects, there may be other virtual objects entering into the range of the virtual scene displayed in the graphical user interface, which are characters controlled by the other players. As shown in FIGS. 2-3, there are a plurality of virtual objects displayed in the range of the virtual scene, in addition to which there is displayed in the graphical user interface a movement control for controlling the movement of the virtual object, a plurality of attack controls, and a discussion control. The discussion control may be used to control the virtual objects to enter the second virtual scene as shown in FIG. 6.

In response to a map display operation triggered by the user, a first virtual map is displayed superimposed on top of the virtual scene displayed in the graphical user interface. For example, in response to a touch operation by the game player on a thumbnail of the scene (such as the scene map shown in FIG. 2), the first virtual map is displayed superimposed over the virtual scene. For example, in response to a control operation that controls the virtual character to perform a second specific action, the first virtual map is displayed superimposed over the virtual scene. Here, the first virtual map includes at least a current position of the first virtual character, a position of each first virtual region in the virtual scene, a position of a connected region, and the like.

When the map switching condition is triggered, the first virtual map superimposed on the virtual scene in the graphical user interface is switched to the second virtual map corresponding to the virtual scene, where at least a portion of the map region of the second virtual map has a higher transparency than the transparency of the map region corresponding to the first virtual map, so that the degree of occlusion of the information in the virtual scene by the switched virtual map is lower than the degree of occlusion before the switching. For example, the map switching condition may be a specific triggering operation, which may be performed by the virtual object in the survival state. For example, in response to a control operation controlling the virtual object to perform a first specific action, the first virtual map superimposed on the virtual scene is switched to the second virtual map corresponding to the virtual scene. For another example, the first virtual map superimposed on the virtual scene is switched to the second virtual map corresponding to the virtual scene by triggering a map switching button.

When the map switching condition is triggered, the first virtual map may be switched to the second virtual map by a specific switching method, for example, replacing the first virtual map superimposed on the virtual scene with the second virtual map corresponding to the virtual scene: or, adjusting the first virtual map to a state where the first virtual map is not visible in the current virtual scene in accordance with a first change threshold of transparency; and replacing the first virtual map superimposed on the virtual scene with the second virtual map corresponding to the virtual scene: or clearing the first virtual map superimposed on the virtual scene, and superimposing and displaying the second virtual map in the virtual scene in accordance with a second change threshold of transparency; or, in accordance with a third change threshold of transparency, adjusting the transparency of the first virtual map, and at the same time, in accordance with a fourth change threshold of transparency, superimposing and displaying the second virtual map on the virtual scene, until the first virtual map is in a state where the first virtual map is not visible in the current virtual scene.

Function Five. This embodiment provides a target attack function in a game. In response to a movement operation for a first virtual object, the first virtual object is controlled to move in a first virtual scene and a range of the first virtual scene displayed in a graphical user interface is controlled to change in accordance with the movement of the first virtual object; and a temporary virtual object is controlled to move from an initial position to a position of a target virtual object in the first virtual scene and to perform a specified operation on the target virtual object, so as to make the target virtual object to enter a target state. The temporary virtual object is a virtual object controlled by the first virtual object having a target identity; and the target identity is an identity attribute assigned at the start of the game. The target virtual object is a virtual object determined from a plurality of second virtual objects in a survival state. The target state is a state where at least a portion of the interactions configured for the target virtual object in a second virtual scene are in a restricted state. The second virtual scene is a virtual scene displayed in the graphical user interface in response to a preset triggering event, and the second virtual scene includes at least one second virtual object or an object icon of the second virtual object.

In this embodiment, the description is made from the perspective of a first virtual object having a target identity: A first virtual scene is first provided in the graphical user interface, as shown in FIGS. 2-3, in which the virtual object may move, or perform a game task, or perform other interactive operations. The user triggers a movement operation for the first virtual object to control the movement of the first virtual object in the first virtual scene, and in most cases, the first virtual object is located in a position at a relative center of a range of the first virtual scene displayed in the graphical user interface. The virtual camera in the first virtual scene follows the movement of the first virtual object, which in turn causes the range of the first virtual scene displayed in the graphical user interface to change in correspondence to the movement of the first virtual object.

The virtual objects participating in the current game match are in the same first virtual scene, therefore, during the movement of the first virtual object, if the first virtual object is closer to the other virtual objects, there may be other virtual objects entering into the range of the first virtual scene displayed in the graphical user interface, which are characters controlled by the other players. As shown in FIGS. 2-3, there are two nearby virtual objects displayed in the range of the first virtual scene, in addition to which there is displayed in the graphical user interface a movement control for controlling the movement of the first virtual object, a plurality of attack controls, and a discussion control. The discussion control may be used to control the virtual objects to enter the second virtual scene.

The temporary virtual object is a virtual object controlled by the first virtual object having a target identity, and the target identity is an identity attribute assigned at the start of the game. The target virtual object is a virtual object determined from a plurality of second virtual objects in a survival state. The target state is a state where at least a portion of the interactions configured for the target virtual object in a second virtual scene are in a restricted state. The second virtual scene is a virtual scene displayed in the graphical user interface in response to a preset triggering event, and the second virtual scene includes at least one second virtual object or an object icon of the second virtual object.

In an initial state, the temporary virtual object is not controlled by the user, but under certain specific conditions, the first virtual object with the target identity itself or the user corresponding to the first virtual object with the target identity has permission to control the temporary virtual object. Specifically; the temporary virtual object may be controlled to move from an initial position to a position of the target virtual object in the first virtual scene, and to perform a specified operation on the target virtual object. The initial position may be a position where the temporary virtual object is located when it is not controlled. The specified operation may be an attack operation that, after executing the specified operation on the target virtual object, produces a specific effect on the target virtual object, i.e., the above-described "make the target virtual object to enter a target state".

When the user controls the first virtual object to move in the first virtual scene, the user may determine the target virtual object from a plurality of second virtual objects in a survival state. The plurality of second virtual objects in the survival state may refer to the virtual objects in the survival state other than the first virtual object in the current game match. Specifically; the user may determine the target virtual object based on the position, behavior, etc. of each of the second virtual objects. For example, the user selects a virtual object as the target virtual object that is relatively isolated and is not easily detected by other virtual objects when attacking. After the target virtual object is determined, the temporary virtual object may be controlled to move from the initial position in the first virtual scene to the position of the target virtual object and the specified operation may be performed on the target virtual object, and then the target virtual object enters the target state.

The second virtual scene is displayed in the graphical user interface upon the triggering of the preset triggering event. For example, the triggering event may be a specific trigger operation, which may be performed by any virtual object in the survival state. For example, in FIG. 6, the second virtual scene may be displayed in the graphical user interface by triggering the discussion control, thereby realizing that the virtual scene is switched from the first virtual scene to the second virtual scene, and all virtual objects in the current game match are moved from the first virtual scene to the second virtual scene. The second virtual scene includes at least one second virtual object, or an object icon of the second virtual object, in addition to the first virtual object, or an object icon of the first virtual object, where the object icon may be an avatar, a name, etc., of the virtual object.

In the second virtual scene, the virtual object in the survival state has the privileges to speak, discuss and vote, but the target virtual object enters the target state, resulting in at least some of the interactions configured for the target virtual object in the second virtual scene being in a restricted state. The interactions may include speaking, discussing and voting interactions, etc. The restricted state may be that a certain interaction is not allowed, or a certain interaction is not allowed within a certain period of time, or a certain interaction is limited to a specified number of times.

As shown in FIG. 6, the second virtual scene includes a plurality of virtual objects in the survival state, including the first virtual object. The first virtual object may send a discussion message through a "Click to Input" control and a "Speech Translation" control on the right side. The discussion message sent by the virtual object may be displayed on a discussion message panel, and the discussion message may include who initiated the discussion, who was attacked, the position of the virtual object that was attacked, and the position of each virtual object at the time of the initiation of the discussion, etc.

The user may vote for a virtual object by clicking on the virtual object in the second virtual scene and displaying a voting button for the virtual object in the vicinity of the virtual object. The user may also click on an abstain button to give up voting privileges for this time.

In the above target attack method in the game, in the first virtual scene, the first virtual object having the target identity may control the temporary virtual object to perform the specified operation on the target virtual object, without controlling the first virtual object to directly perform the specified operation on the target virtual object, and the attack method is easy to operate, which may help the first virtual object to reduce the risk of exposing the target identity, and to improve the success rate of the attack.

Function Six. This embodiment provides an interactive data processing function in a game. In response to a touch operation for a movement control region, a first virtual object is controlled to move in a virtual scene, and a range of the virtual scene displayed in a graphical user interface is controlled to change according to the movement of the first virtual object: it is determined that the first virtual object moves to a responsive region of a target virtual entity in the virtual scene, the target virtual entity being provided in the virtual scene to be interacted with the virtual object; and in response to a control command triggered by the touch operation, a display state of the first virtual object is controlled to switch to an invisible state and a marker for referring to the first virtual object is displayed in a region of the target virtual entity.

The movement control region is used to control the movement of the virtual object in the virtual scene, and the movement control region may be a virtual joystick, through which a direction of the movement of the virtual object may be controlled, and a speed of the movement of the virtual object may also be controlled.

The virtual scene displayed in the graphical user interface is mainly obtained by taking images of a virtual scene range corresponding to the position of the virtual object through the virtual camera. During the movement of the virtual object, the virtual camera may usually be configured to follow the movement of the virtual object, in which case the range of the virtual scene taken by the virtual camera will also follow the movement.

A number of virtual entities with interaction functions may be provided in the virtual scene, and the virtual entities may interact with the virtual objects. The interaction may be triggered when the virtual object is located in the responsive region of the virtual entity: At least one virtual entity having an interaction function may be included in the virtual scene, and the target virtual entity is any one of the at least one virtual entity having an interaction function.

The range of the responsive region of the virtual entity may be set in advance, for example, the range of the responsive region may be set according to the size of the virtual entity, or the range of the responsive region may be set according to the type of the virtual entity, which may be set according to the actual requirements. For example, the range of the responsive region of the virtual entity of a vehicle type may be set to be greater than the region where the virtual entity is located, and the range of the responsive region of the virtual entity of a prop type used for pranks may be set to be equal to the region where the virtual entity is located.

The touch operation, for triggering the control command, may be a specific operation for a specified area or a specific operation for a specified object. For example, the control command may be triggered by double clicking on the target virtual entity. For another example, an interactive control may be provided in the graphical user interface, and the control command may be triggered by clicking on the interactive control. The interactive control may be provided after determining that the first virtual object moves to the responsive region of the target virtual entity in the virtual scene. Based on this, the method may further include: controlling the graphical user interface to display the interactive control of the target virtual entity: wherein the control command triggered by the touch operation includes a control command triggered by touching the interactive control.

This embodiment of the present disclosure may realize that after a game player triggers an interaction with a virtual object, the display state of the virtual object may be controlled to switch to an invisible state, and the switching of the display state as well as the operation for switching will not affect the process of the game by themselves, which increases the interaction with the game player, improves the interestingness, and enhances the user experience.

In some embodiments, the target virtual entity may be a virtual vehicle, and the virtual vehicle may be pre-set with a preset threshold value, which is used to indicate a maximum number of bearers of the virtual vehicle, that is, a maximum number of virtual objects that are invisible on the virtual vehicle. Based on this, if it is determined that the virtual vehicle is fully loaded, a player who subsequently performs an invisible switch may be instructed that the invisibility has failed.

In some embodiments, the reasoning game may include two sessions that may be divided into two parts, an action session and a voting session. In the action session, all virtual objects in the survival state (players in the game) may act, e.g., they may do tasks, they may mess up, etc. In the voting session, players may gather to discuss and vote on the results of their reasoning, e.g., to reason about the identity of each virtual object, wherein the different identities of virtual objects may correspond to different tasks. In this type of game, a skill may also be released in the region of the target virtual entity to perform a task, or to cause a disturbance, and the like. Based on this, after determining that the first virtual object moves to the responsive region of the target virtual entity in the virtual scene, the method may further include: responding to a skill release command triggered by the touch operation, determining at least one virtual object that is invisible in the region of the target virtual entity as a candidate virtual object; and randomly determining one of the at least one candidate virtual object as the object on which the skill release command is to be acted upon.

The virtual object on which the skill release command triggered by touch operation acts may be a character in invisible state or a virtual object in non-invisible state.

Function Seven. This embodiment provides a scene recording function in a game. A game interface is displayed on a graphical user interface, the game interface including at least part of a first virtual scene in a first game task phase, and a first virtual object located in the first virtual scene: in response to a movement operation for the first virtual object, a range of the virtual scene displayed in the game interface is controlled to change according to the movement operation: an image of a preset range of a current game interface is acquired in response to a record command triggered in the first game task phase; the image is stored; and the image is displayed in response to a view command triggered in a second game task phase, the second game task phase and the first game task phase being different task phases in a game match that the first virtual object is currently in.

In this embodiment, the description is made from the perspective of a first virtual object having a target identity: A first virtual scene is first provided in the graphical user interface, as shown in FIGS. 2-3, in which the virtual object may move, or perform a game task, or perform other interactive operations. The user triggers a movement operation for the first virtual object to control the movement of the first virtual object in the first virtual scene, and in most cases, the first virtual object is located in a position at a relative center of a range of the first virtual scene displayed in the graphical user interface. The virtual camera in the first virtual scene follows the movement of the first virtual object, which in turn causes the range of the first virtual scene displayed in the graphical user interface to change in correspondence to the movement of the first virtual object.

The virtual objects participating in the current game match are in the same first virtual scene, therefore, during the movement of the first virtual object, if the first virtual object is closer to the other virtual objects, there may be other virtual objects entering into the range of the first virtual scene displayed in the graphical user interface, which are characters controlled by the other players. As shown in FIGS. 2-3, there are two nearby virtual objects displayed in the range of the first virtual scene, in addition to which there is displayed in the graphical user interface a movement control for controlling the movement of the first virtual object, a plurality of attack controls, and a discussion control. The discussion control may be used to control the virtual objects to enter the second virtual scene.

When the user controls the first virtual object to move in the first virtual scene, the user may determine the target virtual object from a plurality of second virtual objects in a survival state. The plurality of second virtual objects in the survival state may refer to the virtual objects in the survival state other than the first virtual object in the current game match. Specifically, the user may determine the target virtual object based on the position, behavior, etc. of each of the second virtual objects. For example, the user selects a virtual object as the target virtual object that is relatively isolated and is not easily detected by other virtual objects when attacking. After the target virtual object is determined, the initial position in the first virtual scene may be controlled to move to the position of the target virtual object and the specified operation may be performed on the target virtual object, and then the target virtual object enters the target state.

The second virtual scene is displayed in the graphical user interface upon the triggering of the preset triggering event. For example, the triggering event may be a specific trigger operation, which may be performed by any virtual object in the survival state. For example, as shown in FIGS. 2-3, the second virtual scene may be displayed in the graphical user interface by triggering the discussion control, thereby realizing that the virtual scene is switched from the first virtual scene to the second virtual scene, and all virtual objects in the current game match are moved from the first virtual scene to the second virtual scene. The second virtual scene includes at least one second virtual object, or an object icon of the second virtual object, in addition to the first virtual object, or an object icon of the first virtual object, where the object icon may be an avatar, a name, etc., of the virtual object.

In the second virtual scene, the virtual object in the survival state has the privileges to speak, discuss and vote, but the target virtual object enters the target state, resulting in at least some of the interactions configured for the target virtual object in the second virtual scene being in a restricted state. The interactions may include speaking, discussing and voting interactions, etc. The restricted state may be that a certain interaction is not allowed, or a certain interaction is not allowed within a certain period of time, or a certain interaction is limited to a specified number of times.

As shown in FIG. 6, the second virtual scene includes a plurality of virtual objects in the survival state, including the first virtual object. The first virtual object may send a discussion message through a "Click to Input" control and a "Speech Translation" control on the right side. The discussion message sent by the virtual object may be displayed on a discussion message panel, and the discussion message may include who initiated the discussion, who was attacked, the position of the virtual object that was attacked, and the position of each virtual object at the time of the initiation of the discussion, etc.

The user may vote for a virtual object by clicking on the virtual object in the second virtual scene and displaying a voting button for the virtual object in the vicinity of the virtual object. The user may also click on an abstain button to give up voting privileges for this time.

In response to a touch operation for a function control, a position marking interface is displayed in the graphical user interface, and in the position marking interface, a character identification of the at least one second virtual object and/or the first virtual object is displayed based on the position marking information reported by the at least one second virtual object and/or the first virtual object.

Function Eight. This embodiment provides a game operation function. A graphical user interface is provided via a terminal, the graphical user interface including a virtual scene and a virtual object, the virtual scene including a plurality of transport regions, the plurality of transport regions including a first transport region and at least one second transport region at a different location in the scene corresponding to the first transport region. In response to a touch operation directed to a movement control region, the virtual object is controlled to move in the virtual scene: it is determined that the virtual object moves to the first transport region, and a first set of directional controls, corresponding to the at least one second transport region, is displayed in the movement control region; and in response to a trigger command directed to a target directional control among the first set of directional controls, the virtual scene displayed in the graphical user interface that includes the first transport region is controlled to change to a virtual scene that includes the second transport region corresponding to the target directional control.

In response to a touch operation directed to a movement control region, the virtual object is controlled to move in the virtual scene: it is determined that the virtual object moves to the first transport region, and a first set of directional controls, corresponding to the at least one second transport region, is displayed in the movement control region; and in response to a trigger command directed to a target directional control among the first set of directional controls, the range of the virtual scene displayed in the graphical user interface that includes the first transport region is controlled to change to a range of a virtual scene that includes the second transport region corresponding to the target directional control.

In this embodiment, the graphical user interface includes at least a portion of a virtual scene and a virtual object. The virtual scene includes a plurality of transport regions, and the plurality of transport regions include a first transport region and at least one second transport region at a different location in the scene corresponding to the first transport region. The first transport region may be an entrance area of a hidden area (e.g., a tunnel, a subway, etc., the tunnel being used as an example in this disclosure). The second transport region may be an exit area of the hidden area.

The graphical user interface may include a movement control region, wherein the position of the movement control region on the graphical user interface may be customized based on actual requirements, for example, it may be set in the lower left, lower right, and other thumb-touchable areas of the graphical user interface for the game player.

FIG. 17 is a schematic diagram of a game interface image provided by some embodiments of the present disclosure. As shown in FIG. 17, a user inputs a touch operation directed to a movement control region to control movement of a virtual object in a virtual scene, and if it is determined that the virtual object moves to a first transport region, a first set of directional controls (directional control 1 and directional control 2) corresponding to at least one second transport region is displayed in the movement control region. The first set of directional controls is used to indicate the direction of the corresponding tunnel exit.

The user inputs a trigger command for the target directional control (directional control 1) of the first set of directional controls to change a range of the virtual scene displayed in the graphical user interface that includes the first transport region to a range of the virtual scene that includes the second transport region corresponding to the target directional control. That is, through the trigger command for the target directional control, the current display in the graphical user interface is made to be the range of the virtual scene of the second transport region corresponding to the directional control 1. The specific implementation of the process may be referred to in the above embodiments.

The device for recording the scene in the game provided in the present disclosure is described below in conjunction with the accompanying drawings, and the device may perform the method for recording the scene in the game shown in any of FIGS. 1-17 described above, and the specific implementations and beneficial effects thereof are referred to above, and will not be repeated hereinafter.

FIG. 18 is a schematic diagram of a structure of an apparatus for recording a scene in a game provided in some embodiments of the present disclosure, in which a graphical user interface is provided via a terminal. As shown in FIG. 18, the apparatus includes a display module 201, an acquisition module 202, and a storage module 203.

The display module 201 is configured to display a game interface on the graphical user interface, the game interface including at least part of a first virtual scene in a first game task phase, and a first virtual object located in the first virtual scene: respond to a movement operation for the first virtual object, and control a range of the virtual scene displayed in the game interface to change according to the movement operation.

The acquisition module 202 is configured to acquire an image of a preset range of a current game interface in response to a record command triggered in the first game task phase.

The storage module 203 is configured to store the image, the image being a reasoning record image of the first virtual object.

On the basis of the above embodiment, the present disclosure may further provide an apparatus for recording a scene in a game, and the implementation process of the above apparatus is illustrated below in conjunction with the accompanying drawings. FIG. 19 is a schematic diagram of a structure of an apparatus for recording a scene in a game provided in some embodiments of the present disclosure. As shown in FIG. 19, the apparatus further includes: a deletion module 204.

The display module 201 is further configured to display the attribute tag within a preset range of the tagged additional virtual object.

The deletion module 204 is configured to in response to an undo move operation, delete the attribute tagging information for the additional virtual object after moving the attribute tag a preset distance away from the tagged additional virtual object.

As shown in FIG. 19, the apparatus further includes a determination module 205 configured to determine whether one or more reasoning record images of the first virtual object currently stored have reached a preset number.

The deletion module 204 is further configured to in response to the one or more reasoning record images reaching the preset number, delete a reasoning record image of the one or more reasoning record images that is the oldest from current time according to an order of storage time, and store the image as the reasoning record image of the first virtual object.

The above apparatus is used to perform the method provided by the foregoing embodiments, which is similar in principle of implementation and technical effect, and will not be repeated herein.

These modules may be one or more integrated circuits configured to implement the above method, for example, one or more Application Specific Integrated Circuits (ASICs), or, one or more microprocessors (e.g., digital signal processors, abbreviated as DSPs), or, one or more Field Programmable Gate Arrays (FPGAs) and so on. For another example, when one of these modules is implemented by scheduling program code through a processing element, the processing element may be a general-purpose processor, such as a Central Processing Unit (CPU) or other processors may call the program code. For yet another example, these modules may be integrated together and implemented in a form of system-on-a-chip (SOC).

FIG. 20 is a schematic diagram of a structure of a device for recording a scene in a game provided in some embodiments of the present disclosure. This device may be integrated into a terminal device or a chip in a terminal device.

The device for recording the scene in the game includes a processor 501, a storage medium 502 and a bus 503.

The storage medium 502 is configured to store a program, and the processor 501 calls the program stored on the storage medium 502 and may perform the following method steps:

displaying a game interface on the graphical user interface, the game interface including at least part of a first virtual scene in a first game task phase, and a first virtual object located in the first virtual scene;

responding to a movement operation for the first virtual object, and controlling a range of the virtual scene displayed in the game interface to change according to the movement operation;

acquiring an image of a preset range of a current game interface in response to a record command triggered in the first game task phase;

storing the image, the image being a reasoning record image of the first virtual object; and displaying the image in response to a view command triggered in a second game task phase, the second game task phase and the first game task phase being different task phases in a game match that the first virtual object is currently in.

In some embodiments, the image of the preset range of the current game interface includes: an image of a preset shape acquired with the first virtual object as a center and a line-of-sight distance of the first virtual object as a radius.

In some embodiments, the game interface includes: an in-view scene screen determined according to a visual range of the first virtual object and an out-of-view scene screen outside the visual range: the in-view scene screen being capable of displaying a second virtual object located within the visual range, the second virtual object being in a same game match as the first virtual object.

In some embodiments, the preset range is determined based on the in-view scene screen.

In some embodiments, before storing the image, the method further includes:

displaying a preview screen of the image; and when the image contains an additional virtual object other than the first virtual object, acquiring attribute tagging information for the additional virtual object in response to a tagging operation on the additional virtual object in the preview screen, wherein the attribute tagging information includes presumed identity information for the additional virtual object.

In some embodiments, displaying the preview screen of the image includes:

displaying the preview screen of the image and providing an attribute tagging control, the attribute tagging control including: at least one attribute tag; and the acquiring the attribute tagging information for the additional virtual object in response to the tagging operation on the additional virtual object in the preview screen, includes:

acquiring the attribute tagging information for the additional virtual object in response to the tagging operation that moves a target tag of the at least one attribute tag to the additional virtual object.

In some embodiments, after acquiring the attribute tagging information for the additional virtual object, the method further includes:

displaying the attribute tag within a preset range of the tagged additional virtual object; and in response to an undo move operation, deleting the attribute tagging information for the additional virtual object after moving the attribute tag a preset distance away from the tagged additional virtual object.

In some embodiments, the method further includes:

obtaining capture time information and/or position coordinate information of the image.

In some embodiments, storing the image includes:

recognizing that the image contains a virtual object other than the first virtual object that does not meet a preset condition, eliminating the virtual object that does not meet the preset condition, and acquiring an updated image, wherein the virtual object that does not meet the preset condition includes a virtual object having an exposed area in a current virtual scene that is less than a preset proportion of the virtual object's own area; and storing the updated image as the reasoning record image of the first virtual object.

In some embodiments, storing the image includes:

determining whether one or more reasoning record images of the first virtual object currently stored have reached a preset number; and in response to the one or more reasoning record images reaching the preset number, deleting a reasoning record image of the one or more reasoning record images that is the oldest from current time according to an order of storage time, and storing the image as the reasoning record image of the first virtual object.

In some embodiments, the method further includes:

in response to an operation on a first image view control in the first game task phase, displaying a thumbnail of at least one reasoning record image currently stored; and in response to a selection operation on a target thumbnail in the thumbnail, displaying a standard image corresponding to the target thumbnail.

In some embodiments, the displaying the image in response to the view command triggered in the second game task phase, includes:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail.

In some embodiments, after the game enters the second game task phase, virtual objects of all game players in a current virtual scene are displayed on the graphical user interface; and the method further includes:

displaying the attribute tagging information corresponding to the tagged virtual object within a preset range of the tagged virtual object in the current virtual scene, according to the attribute tagging information corresponding to a reasoning record image closest to current time.

In some embodiments, after the game enters the second game task phase, virtual objects of all game players in a current virtual scene are displayed on the graphical user interface; and the method further includes:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail, wherein the attribute tagging information corresponding to the tagged virtual object is displayed within a preset range of the tagged virtual object in the standard image.

In some embodiments, after the game enters the second game task phase, the method further includes:

in response to an operation on a second image view control in the second game task phase, displaying a thumbnail of at least one reasoning record image currently stored, wherein corresponding capture time information and/or position coordinate information is displayed at a preset position of each of the thumbnail.

Specific implementations in this embodiment may be referred to in the method embodiment and will not be repeated here.

The present disclosure further provides a program product, such as a storage medium, on which a computer program is stored, including a program that, when run by a processor, causes the processor to perform the following method steps:

displaying a game interface on the graphical user interface, the game interface including at least part of a first virtual scene in a first game task phase, and a first virtual object located in the first virtual scene;

responding to a movement operation for the first virtual object, and controlling a range of the virtual scene displayed in the game interface to change according to the movement operation;

acquiring an image of a preset range of a current game interface in response to a record command triggered in the first game task phase;

storing the image, the image being a reasoning record image of the first virtual object; and displaying the image in response to a view command triggered in a second game task phase, the second game task phase and the first game task phase being different task phases in a game match that the first virtual object is currently in.

In some embodiments, the image of the preset range of the current game interface includes: an image of a preset shape acquired with the first virtual object as a center and a line-of-sight distance of the first virtual object as a radius.

In some embodiments, the game interface includes: an in-view scene screen determined according to a visual range of the first virtual object and an out-of-view scene screen outside the visual range: the in-view scene screen being capable of displaying a second virtual object located within the visual range, the second virtual object being in a same game match as the first virtual object.

In some embodiments, the preset range is determined based on the in-view scene screen.

In some embodiments, before storing the image, the method further includes:

displaying a preview screen of the image; and when the image contains an additional virtual object other than the first virtual object, acquiring attribute tagging information for the additional virtual object in response to a tagging operation on the additional virtual object in the preview screen, wherein the attribute tagging information includes presumed identity information for the additional virtual object.

In some embodiments, displaying the preview screen of the image includes:

displaying the preview screen of the image and providing an attribute tagging control, the attribute tagging control including: at least one attribute tag; and the acquiring the attribute tagging information for the additional virtual object in response to the tagging operation on the additional virtual object in the preview screen, includes:

acquiring the attribute tagging information for the additional virtual object in response to the tagging operation that moves a target tag of the at least one attribute tag to the additional virtual object.

In some embodiments, after acquiring the attribute tagging information for the additional virtual object, the method further includes:

displaying the attribute tag within a preset range of the tagged additional virtual object; and in response to an undo move operation, deleting the attribute tagging information for the additional virtual object after moving the attribute tag a preset distance away from the tagged additional virtual object.

In some embodiments, the method further includes:

obtaining capture time information and/or position coordinate information of the image.

In some embodiments, storing the image includes:

recognizing that the image contains a virtual object other than the first virtual object that does not meet a preset condition, eliminating the virtual object that does not meet the preset condition, and acquiring an updated image, wherein the virtual object that does not meet the preset condition includes a virtual object having an exposed area in a current virtual scene that is less than a preset proportion of the virtual object's own area; and storing the updated image as the reasoning record image of the first virtual object.

In some embodiments, storing the image includes:

determining whether one or more reasoning record images of the first virtual object currently stored have reached a preset number; and in response to the one or more reasoning record images reaching the preset number, deleting a reasoning record image of the one or more reasoning record images that is the oldest from current time according to an order of storage time, and storing the image as the reasoning record image of the first virtual object.

In some embodiments, the method further includes:

in response to an operation on a first image view control in the first game task phase, displaying a thumbnail of at least one reasoning record image currently stored; and in response to a selection operation on a target thumbnail in the thumbnail, displaying a standard image corresponding to the target thumbnail.

In some embodiments, the displaying the image in response to the view command triggered in the second game task phase, includes:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail.

In some embodiments, after the game enters the second game task phase, virtual objects of all game players in a current virtual scene are displayed on the graphical user interface; and the method further includes:

displaying the attribute tagging information corresponding to the tagged virtual object within a preset range of the tagged virtual object in the current virtual scene, according to the attribute tagging information corresponding to a reasoning record image closest to current time.

In some embodiments, after the game enters the second game task phase, virtual objects of all game players in a current virtual scene are displayed on the graphical user interface; and the method further includes:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail, wherein the attribute tagging information corresponding to the tagged virtual object is displayed within a preset range of the tagged virtual object in the standard image.

In some embodiments, after the game enters the second game task phase, the method further includes:

in response to an operation on a second image view control in the second game task phase, displaying a thumbnail of at least one reasoning record image currently stored, wherein corresponding capture time information and/or position coordinate information is displayed at a preset position of each of the thumbnail.

It should be understood in the several embodiments provided in the present disclosure that the devices and methods disclosed, may be implemented in other ways. For example, the device embodiments described above are merely schematic. For example, the division of the units described is only a logical functional division, and in the actual implementation, there may be other ways of division, such as multiple units or components may be combined or may be integrated into another system, or some features may be ignored, or not implemented. On the other hand, the coupling or direct coupling or communication connection between each other shown or discussed may be a connection through some interface, and the indirect coupling or communication connection of devices or units, may be electrical, mechanical or other forms.

The units illustrated as separated components may or may not be physically separated, and the components shown as units may or may not be physical units, i.e., they may be located in a single place, or they may be distributed to a plurality of network units. Some or all of these units may be selected to fulfill the purpose of a scheme of this embodiment according to actual requirements.

In addition, the respective functional units in various embodiments of the present disclosure may be integrated in a single processing unit, or each unit may physically exist separately, or two or more units may be integrated in a single unit. The integrated units mentioned above may be implemented either in the form of hardware or in the form of hardware combined with software functional units.

The integrated unit, implemented in the form of a software functional unit, may be stored in a computer-readable storage medium. The software functional unit is stored in the storage medium including several instructions to cause a computer device (which may be a personal computer, a server, or a network device, etc.) or a processor to perform some of the steps of the method described in various embodiments of the present disclosure. The storage medium includes: USB flash drives, removable hard disks, Read-Only Memory (ROM), Random Access Memory (RAM), magnetic disks or CD-ROMs, and other medium that may store program code.

What is claimed is:

1. A method for recording a scene in a game, wherein a graphical user interface is provided via a terminal, the method comprising:

displaying a game interface on the graphical user interface, the game interface comprising at least part of a first virtual scene in a first game task phase, and a first virtual object located in the first virtual scene;

responding to a movement operation for the first virtual object, and controlling a range of the virtual scene displayed in the game interface to change according to the movement operation;

acquiring a target image of a preset range of a current game interface in response to a record command triggered in the first game task phase;

storing the target image as a reasoning record image of the first virtual object; and displaying the reasoning record image in response to a view command triggered in a second game task phase, the second game task phase and the first game task phase being different task phases in a game match that the first virtual object is currently in.

2. The method of claim 1, wherein the target image of the preset range of the current game interface comprises: an image of a preset shape acquired with the first virtual object as a center and a line-of-sight distance of the first virtual object as a radius.

3. The method of claim 1, wherein the game interface comprises: an in-view scene screen determined according to a visual range of the first virtual object and an out-of-view scene screen outside the visual range; the in-view scene screen being capable of displaying a second virtual object located within the visual range, the second virtual object being in a same game match as the first virtual object.

4. The method of claim 3, wherein the preset range is determined based on the in- view scene screen.

5. The method of claim 1, wherein before storing the target image, the method further comprises:

displaying a preview screen of the target image; and when the target image contains an additional virtual object other than the first virtual object, acquiring attribute tagging information for the additional virtual object in response to a tagging operation on the additional virtual object in the preview screen, wherein the attribute tagging information comprises presumed identity information for the additional virtual object.

6. The method of claim 5, wherein displaying the preview screen of the target image comprises:

displaying the preview screen of the target image and an attribute tagging control, the attribute tagging control comprising: at least one attribute tag; and wherein acquiring the attribute tagging information for the additional virtual object in response to the tagging operation on the additional virtual object in the preview screen, comprises:

acquiring the attribute tagging information for the additional virtual object in response to the tagging operation that moves a target tag of the at least one attribute tag to the additional virtual object.

7. The method of claim 6, wherein after acquiring the attribute tagging information for the additional virtual object, the method further comprises:

displaying the attribute tag within a preset range of the additional virtual object; and in response to an undo move operation, deleting the attribute tagging information for the additional virtual object after moving the attribute tag a preset distance away from the additional virtual object.

8. The method of claim 1, further comprising:

obtaining capture time information and/or position coordinate information of the target image.

9. The method of claim 1, wherein storing the target image comprises:

recognizing that the target image contains a virtual object other than the first virtual object that does not meet a preset condition, eliminating the virtual object that does not meet the preset condition, and acquiring an updated image, wherein the virtual object that does not meet the preset condition comprises a virtual object having an exposed area in a current virtual scene that is less than a preset proportion of the virtual object's own area; and storing the updated image as the reasoning record image of the first virtual object.

10. The method of claim 1, wherein storing the target image comprises:

determining whether one or more reasoning record images of the first virtual object currently stored have reached a preset number; and in response to the one or more reasoning record images reaching the preset number, deleting a reasoning record image of the one or more reasoning record images that is the oldest from current time according to an order of storage time, and storing the target image as the reasoning record image of the first virtual object.

11. The method of claim 1, further comprising:

in response to an operation on a first image view control in the first game task phase, displaying a thumbnail of at least one reasoning record image currently stored; and in response to a selection operation on a target thumbnail in the thumbnail, displaying a standard image corresponding to the target thumbnail.

12. The method of claim 1, wherein displaying the reasoning record image in response to the view command triggered in the second game task phase, comprises:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail.

13. The method of claim 5, wherein after the game enters the second game task phase, virtual objects of all game players in a current virtual scene are displayed on the graphical user interface; and the method further comprises:

displaying the attribute tagging information corresponding to the tagged virtual object within a preset range of the tagged virtual object in the current virtual scene, wherein the attribute tagging information corresponds to a reasoning record image closest to current time.

14. The method of claim 5, wherein after the game enters the second game task phase, virtual objects of all game players in a current virtual scene are displayed on the graphical user interface; and the method further comprises:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail, wherein the attribute tagging information corresponding to the tagged virtual object is displayed within a preset range of the tagged virtual object in the standard image.

15. The method of claim 8, wherein after the game enters the second game task phase, the method further comprises:

in response to an operation on a second image view control in the second game task phase, displaying a thumbnail of at least one reasoning record image currently stored, wherein corresponding capture time information and/or position coordinate information is displayed at a preset position of the thumbnail.

16. The method of claim 6, wherein after the game enters the second game task phase, virtual objects of all game players in a current virtual scene are displayed on the graphical user interface; and the method further comprises:

displaying the attribute tagging information corresponding to the tagged virtual object within a preset range of the tagged virtual object in the current virtual scene, wherein the attribute tagging information corresponds to a reasoning record image closest to current time.

17. The method of claim 6, wherein after the game enters the second game task phase, virtual objects of all game players in a current virtual scene are displayed on the graphical user interface; and the method further comprises:

in response to an operation on a second image view control in the second game task phase, displaying a thumbnail of at least one reasoning record image currently stored; and in response to a selection operation on a target thumbnail in the thumbnail, displaying a standard image corresponding to the target thumbnail, wherein the attribute tagging information corresponding to the tagged virtual object is displayed within a preset range of the tagged virtual object in the standard image.

18. A device for recording a scene in a game, comprising: a processor, a storage medium and a bus, the storage medium storing machine-readable instructions executable by the processor; wherein the processor communicates with the storage medium via the bus when the device for recording the scene in the game is in operation, and the processor executes the machine-readable instructions to:

display a game interface on the graphical user interface, the game interface comprising at least part of a first virtual scene in a first game task phase, and a first virtual object located in the first virtual scene;

respond to a movement operation for the first virtual object, and control a range of the virtual scene displayed in the game interface to change according to the movement operation;

acquire a target image of a preset range of a current game interface in response to a record command triggered in the first game task phase;

store the target image as a reasoning record image of the first virtual object; and display the reasoning record image in response to a view command triggered in a second game task phase, the second game task phase and the first game task phase being different task phases in a game match that the first virtual object is currently in.

19. A non-transitory storage medium, having a computer program stored thereon, wherein the computer program, when run by a processor, causes the processor to;

display a game interface on the graphical user interface, the game interface comprising at least part of a first virtual scene in a first game task phase, and a first virtual object located in the first virtual scene;

respond to a movement operation for the first virtual object, and control a range of the virtual scene displayed in the game interface to change according to the movement operation;

acquire a target image of a preset range of a current game interface in response to a record command triggered in the first game task phase;

store the target image as a reasoning record image of the first virtual object; and display the reasoning record image in response to a view command triggered in a second game task phase, the second game task phase and the first game task phase being different task phases in a game match that the first virtual object is currently in.

* * * * *